US010573887B2

(12) United States Patent
Kovalenko et al.

(10) Patent No.: US 10,573,887 B2
(45) Date of Patent: Feb. 25, 2020

(54) TIN BASED ANODE MATERIAL FOR A RECHARGEABLE BATTERY AND PREPARATION METHOD

(71) Applicant: Belenos Clean Power Holding AG, Bienne (CH)

(72) Inventors: Maksym Kovalenko, Zurich (CH); Maryna Bodnarchuk, Zurich (CH); Kostiantyn Kravchyk, Zurich (CH)

(73) Assignee: Belenos Clean Power Holding AG, Bienne (CH)

( * ) Notice: Subject to any disclaimer, the term of this patent is extended or adjusted under 35 U.S.C. 154(b) by 0 days.

(21) Appl. No.: 14/437,930

(22) PCT Filed: Nov. 28, 2013

(86) PCT No.: PCT/EP2013/075020
§ 371 (c)(1),
(2) Date: Apr. 23, 2015

(87) PCT Pub. No.: WO2014/083135
PCT Pub. Date: Jun. 5, 2014

(65) Prior Publication Data
US 2015/0303459 A1    Oct. 22, 2015

(30) Foreign Application Priority Data
Nov. 30, 2012  (EP) ..................... 12195159

(51) Int. Cl.
*H01M 4/36* (2006.01)
*H01M 10/0525* (2010.01)
(Continued)

(52) U.S. Cl.
CPC .......... *H01M 4/366* (2013.01); *H01M 4/387* (2013.01); *H01M 10/054* (2013.01); *H01M 10/0525* (2013.01); *H01M 2220/30* (2013.01)

(58) Field of Classification Search
CPC ........ H01M 4/366; H01M 4/387; H01M 4/48; H01M 10/0525; H01M 10/054; H01M 2220/30; Y02E 60/122
See application file for complete search history.

(56) References Cited

U.S. PATENT DOCUMENTS 8,137,525 B1 *  3/2012  Harreld ................... C25D 1/08
                                                          205/159
8,192,866 B2    6/2012  Golightly et al.
(Continued)

OTHER PUBLICATIONS

Lee, Youngmin, et al. "Hollow Sn—SnO2 nanocrystal/graphite composites and their lithium storage properties." ACS applied materials & interfaces 4.7 (2012): 3459-3464.*
(Continued)

*Primary Examiner* — Stewart A Fraser
(74) *Attorney, Agent, or Firm* — Oblon, McClelland, Maier & Neustadt, L.L.P.

(57) ABSTRACT

A tin based anode material for a rechargeable battery comprises nanoparticles of composition $SnM_xO_y$, wherein M is a further element selected from the group 5 consisting of Ni, Cu, In, Al, Ge, Pb, Bi, Sb, Fe, Co, Ga, with $0 \leq x \leq 0.5$ and $0 \leq y \leq 2+2x$. The nanoparticles form a substantially monodisperse ensemble with an average size not exceeding 30 nm and a size deviation not exceeding 15%, the nanoparticles optionally being coated with a capping species. A method for preparing the tin based anode material is carried out in situ in a non-aqueous solvent and starts by reacting a tin salt and an organometallic amide reactant and oleylamine.

19 Claims, 18 Drawing Sheets

(51) Int. Cl.
  *H01M 4/38* (2006.01)
  *H01M 10/054* (2010.01)

(56) References Cited

U.S. PATENT DOCUMENTS

| 2007/0020519 | A1 | 1/2007 | Kim et al. | |
| 2009/0226812 | A1* | 9/2009 | Golightly | B22F 1/0018 429/231.95 |
| 2009/0297951 | A1* | 12/2009 | Katsura | C23C 14/0635 429/231.8 |
| 2012/0183860 | A1* | 7/2012 | Naoi | H01G 11/24 429/231.8 |

OTHER PUBLICATIONS

Noh, Mijung, et al. "Monomer-capped tin metal nanoparticles for anode materials in lithium secondary batteries." Chemistry of materials 17.13 (2005): 3320-3324.*

Wang, Yong, Jim Y. Lee, and Theivanayagam C. Deivaraj. "A microemulsion-based preparation of tin/tin oxide core/shell nanoparticles with particle size control." Journal of Materials Chemistry 14.3 (2004): 362-365. (Year: 2004).*

Wang, Xiao-Liang, et al. "Sn/SnO x core—shell nanospheres: synthesis, anode performance in Li ion batteries, and superconductivity." The Journal of Physical Chemistry C 114.35 (2010): 14697-14703. (Year: 2010).*

International Preliminary Report on Patentability in corresponding application PCT/EP2013/075020, completed Dec. 22, 2014, and response.

Davar, Fatemah et al., "Synthesis and characterization of SnO2 nanoparticles by thermal decomposition of new inorganic precursor," Journal of Alloys and Compounds 496 (2010) 638-643.

Salvati-Niasari, Masoud et al., "Synthesis, characterization and optical properties of tin oxide nanoclusters prepared from a novel precursor via thermal decomposition route," Inorganica Chimica Acta 363 (2010) 1719-1726.

Pu, Weihua et al., "Electrodeposition of Sn—Cu alloy anodes for lithium batteries," Electrochimica Acta 50 (2005) 4140-4145.

Leroux, Fabrice et al., "Uptake of lithium by layered molybdenum oxide and its tin exchange derivatives: high volumetric capacity materials," Solid State Ionics 133 (2000) 37-50.

International Search Report issued in corresponding application PCT/EP2013/075020, completed Dec. 18, 2013 and dated Jan. 7, 2014.

Derrien, G.; Hassoun, J.; Panero, S.; Scrosati, B., "Nanostructured Sn—C Composite as an Advanced Anode Material in High-Performance Lithium-Ion Batteries," Advanced Materials 2007, 19, 2336.

Chang, C.-C.; Liu, S.-J.; Wu, J.-J.; Yang, C.-H. "Nano-tin Oxide/Tin Particles on a Graphite Surface as an Anode Material for Lithium-Ion Batteries," The Journal of Physical Chemistry C 2007, 111, 16423.

Noh, M.; Kwon, Y.; Lee, H.; Cho, J.; Kim, Y.; Kim, M. G. "Amorphous Carbon-Coated Tin Anode Material for Lithium Secondary Battery," Chemistry of Materials 2005, 17, 1926.

Yang, C.-S.; Liu, Q.; Kauzlarich, S. M.; Phillips, B. "Synthesis and Characterization of Sn/R, Sn/Si-R, and Sn/SiO2 Core/Shell Nanoparticlels," Chem. Mater. 2000, 12, 983.

Nayral, C.; Ould-Ely, T.; Maisonnat, A.; Chaudret, B.; Fau, P.; Lescouzères, L.; Peyre-Lavigne, A. "A Novel Mechanism for the Synthesis of Tin/Tin Oxide Nanoparticles of Low Size Dispersion and of Nanostructure SnO2 for the Sensitive Layers of Gas Sensors," Adv. Mater. 1999, 11, 61.

Nayral, C.; Viala, E.; Fau, P.; Senocq, F.; Jumas, J.-C.; Maisonnat, A.; Chaudret, B. Chemistry—"Synthesis of Tin and Tin Oxide Nanoparticles of Low Size Dispersity for Application in Gas Sensing," A European Journal 2000, 6, 4082.

Wang, X.-L.; Feygenson, M.; Aronson, M. C.; Han, W.-Q. "Nanospheres of a New Intermetallic FeSn5 Phase: Synthesis, Magnetic Properties and Anode Performance in Li-ion Batteries," The Journal of Physical Chemistry C 2010, 114, 14697.

Dreyer, A.; Ennen, I.; Koop, T.; Hütten, A.; Jutzi, "From Nanoscale Liquid Spheres to Anisotropic Crystalline Particles of Tin: Decomposition of Decamethylstannocene in Organic Solvents," P. Small 2011, 7, 3075.

Chou, N. H.; Schaak, R. E. "A Library of Single-Crystal Metal-Tin Nanorods: Using Diffusion as a Tool for Controlling the Morphology of Intermetallic Nanocrystals," Chemistry of Materials 2008, 20, 2081.

Hsu, Y.-J.; Lu, S.-Y.; Lin, Y.-F. "Nanostructure of Sn and Thier Enhanced, Shape-Dependent Superconducting Properties," Small 2006, 2, 268.

Grandjean, D.; Benfield, R. E.; Nayral, C.; Maisonnat, A.; Chaudret, B. "EXAFS and XANES Study of a Pure and Pd Doped Novel Sn/SnOx Nanomaterial," The Journal of Physical Chemistry B 2004, 108, 8876.

Yu, H.; Gibbons, P. C.; Kelton, K. F.; Buhro, W. E. "Heterogeneous Seeded Growth: A Potentially General Synthesis of Monodisperse Metallic Nanoparticles," Journal of the American Chemical Society 2001, 123, 9198.

Chou, N. H.; Schaak, R. E. :Shape-Controlled Conversion of -Sn Nanocrystals into Intermetallic M-Sn (M ) Fe, Co, Ni, Pd) Nanocrystals,: J. Am. Chem. Soc. 2007, 129, 7339.

Mondini, S.; Ferretti, A. M.; Puglisi, A.; Ponti, A. "Pebbles and Pebblejuggler: software for accurate, unbiased, and fast measurement and analysis of nanoparticle morphology from transmission electron microscopy (TEM) micrographs," Nanoscale 2012, 4, 5356.

Wołcyrz, M.; Kubiak, R.; Maciejewski, S. "X-Ray Investigation of Thermal Expansion and Atomic Thermal Vibrations of Tin, Indium, and Their Alloys," physica status solidi (b) 1981, 107, 245.

Cossement, C.; Darville, J.; Gilles, J. M.; Nagy, J. B.; Fernandez, C.; Amoureux, J. P. "Chemicall Shift Anisotropy and Indirect Coupling in SnO2 and SnO," Magnetic Resonance in Chemistry 1992, 30, 263.

Indris, S.; Scheuermann, M.; Becker, S. M.; Šepelák, V.; Kruk, R.; Suffner, J.; Gyger, F.; Feldmann, C.; Ulrich, A. S.; Hahn, H. "Local Structural Disorder and Relaxation in SnO2 Nanostructures Studied by 119Sn MAS NMR and 119Sn Mossbauer Spectroscopy," J. Phys. Chem. C. 2011, 115, 6433.

Takahashi, H.; Meshitsuka, S.; Higasi, K. "Infrared spectra and lattice vibrations of alkali and alkaline-earth metal sulfates," Spectrochimica Acta Part A: Molecular Spectroscopy 1975, 31, 1617.

Adler, H. H.; Kerr, P. F. "Variations in Infrared Spectra, Molecular Symmetry and Site Symmetru of Sulfate Minerals," American Mineralogist 1965, 50, 132.

Beattie, S. D.; Larcher, D.; Morcrette, M.; Simon, B.; Tarascon, J. M. "Si Electrodes for Li-Ion Batteries—A New Way to Look at an Old Problem," Journal of the Electrochemical Society 2008, 155, A158.

* cited by examiner

FIG. 1C    FIG. 1D
diameter, nm
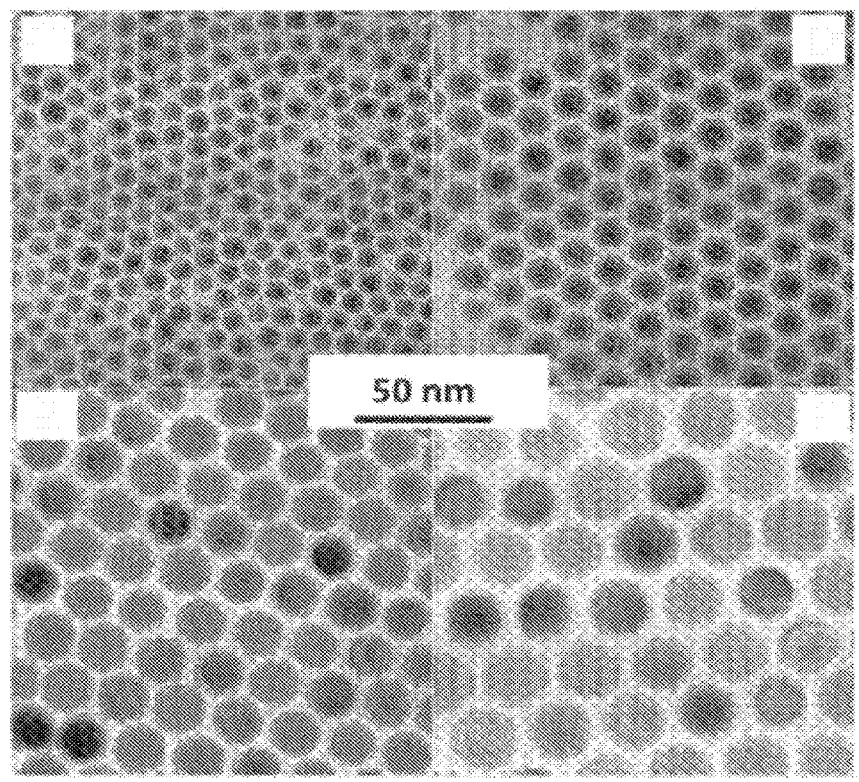
FIG. 1E    FIG. 1F
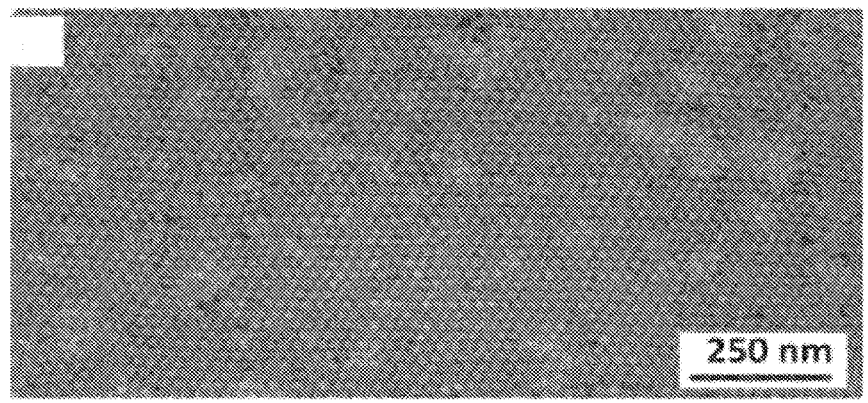
FIG. 1G

Synthesis without LiNTMS

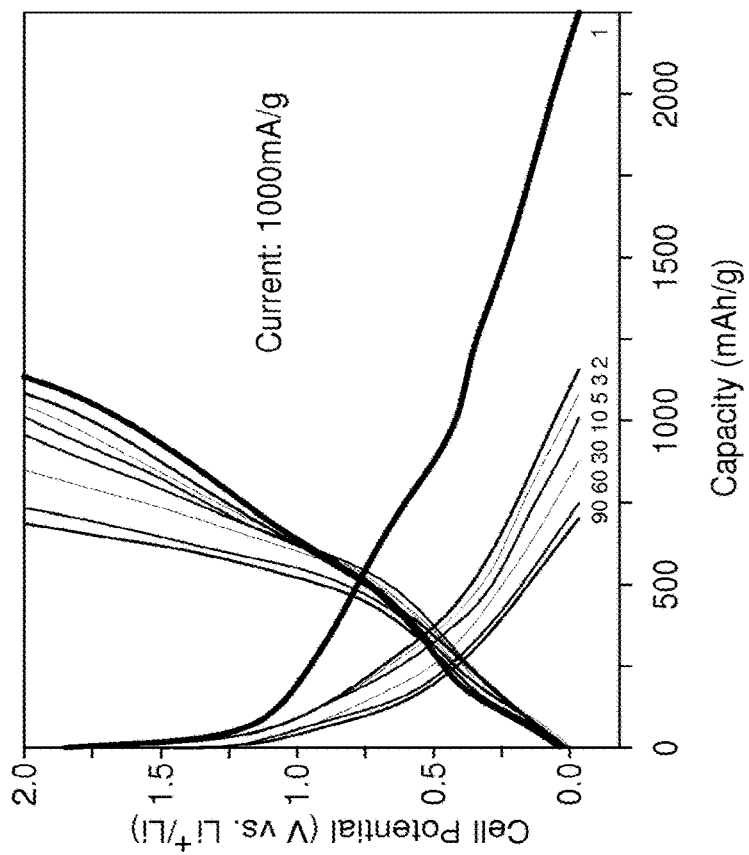
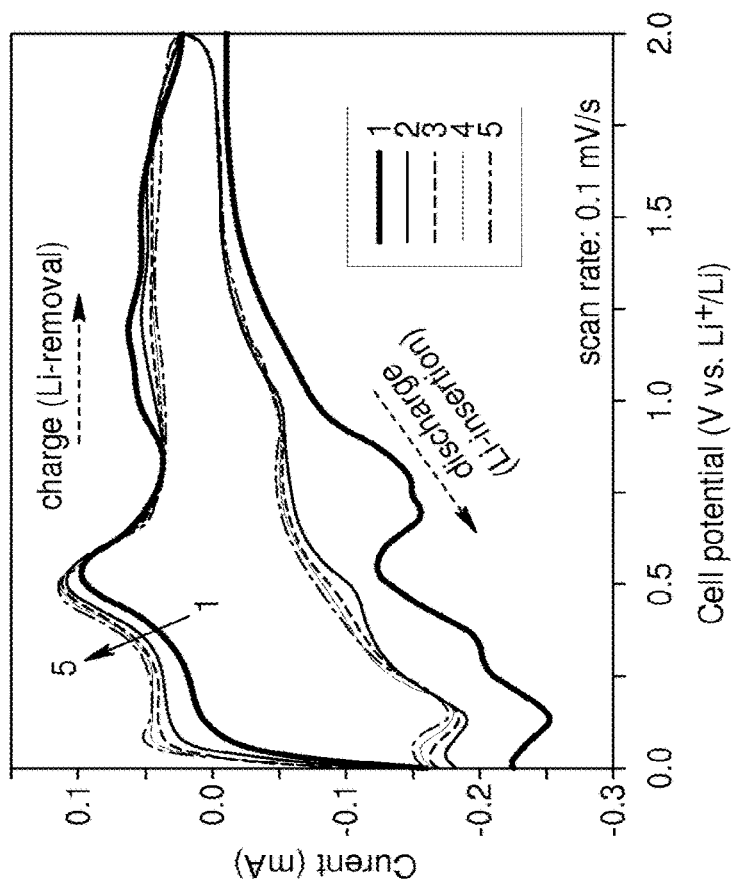
FIG. 11A
FIG. 11B

FIG. 12
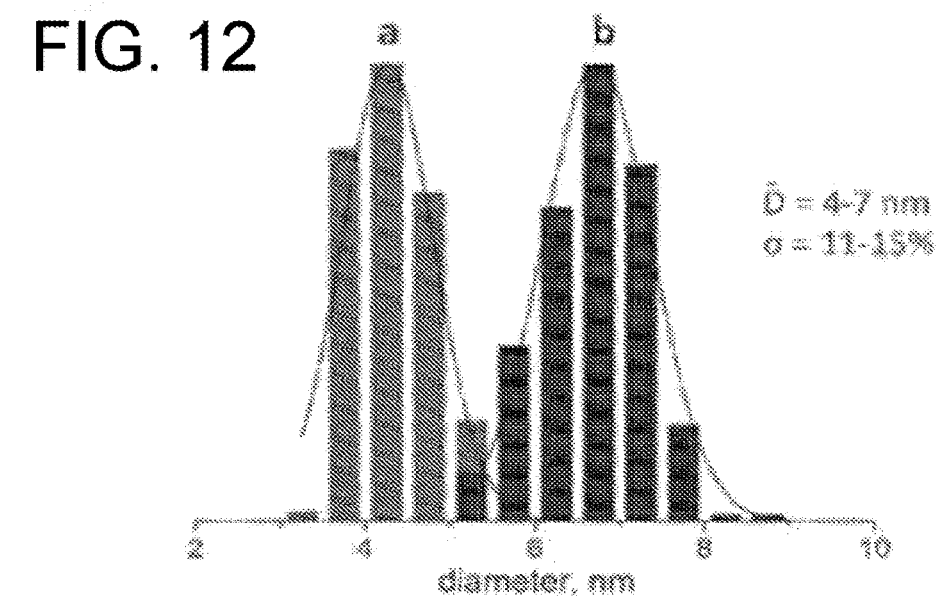
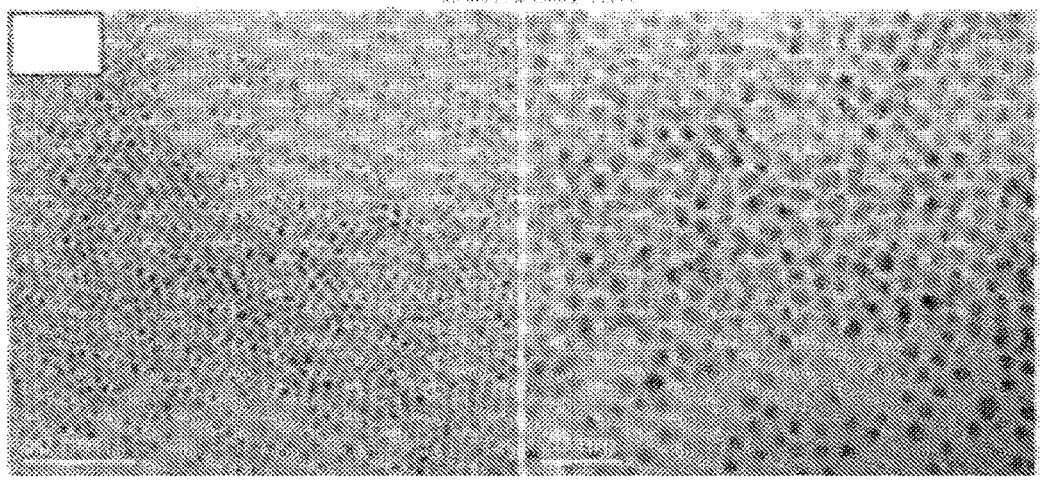
FIG. 12A
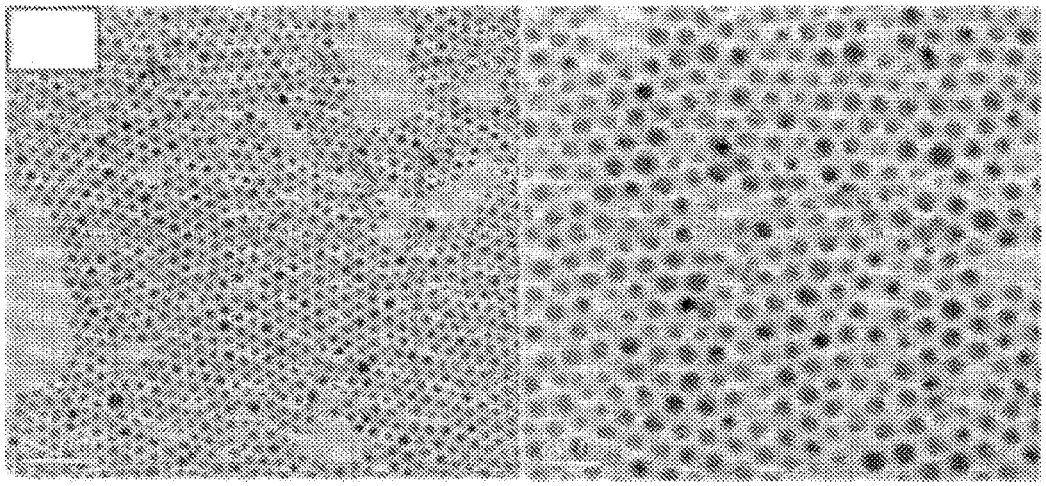
FIG. 12B

TIN BASED ANODE MATERIAL FOR A RECHARGEABLE BATTERY AND PREPARATION METHOD

This is a National Phase Application in the United States of International Patent Application PCT/EP 2013/075020, filed on Nov. 28, 2013, which claims priority on European Patent Application No. 12195159, filed Nov. 30, 2012. The entire disclosures of the above patent applications are hereby incorporated by reference.

FIELD OF THE INVENTION

The present invention generally relates to a tin based anode material for a rechargeable battery, to a method for preparing such material and to a battery, in particular a lithium ion battery comprising such material.

BACKGROUND OF THE INVENTION

Lithium ion batteries are the key technology for the majority of rechargeable battery systems in portable electronics and for e-mobility. Most of today's applications of lithium ion batteries face growing demands for significantly improved performance: higher energy density, improved cycling performance, safety, flexibility in device integration, and so forth.

As to what concerns anode materials for lithium ion batteries, a clear challenge is to implement an alternative to graphite, which is presently dominating the market of lithium ion batteries. Graphite based anodes provide for a theoretical gravimetric capacity of 372 mA h g$^{-1}$ by forming LiC$_6$. The most promising near-future, high-capacity alternatives or useful additives to carbon are those based on tin (Sn) and silicon (Si), and some other elements that can form alloys with lithium, all having significantly higher theoretical specific capacities than carbon. In particular, the gravimetric capacity of fully lithiated tin (992 mA h g$^{-1}$ for Li$_{4.4}$Sn) is more than twice as high as that of graphite, when the volumetric capacity is higher by at least one order of magnitude. Other commonly discussed advantages of metallic tin are the following. Firstly, tin has a higher operating potential when used as anode, making it less reactive towards electrolytes and, therefore, much safer. Furthermore, unlike graphite, it does not undergo irreversible capacity losses due to solvent intercalation. Moreover, tin is highly abundant, inexpensive and environmentally benign.

The major issue with alloy anodes is their severe capacity fade arising from a huge volume change up to 300% occurring during a charge-discharge process, i.e. during alloying-dealloying. This volume change leads to lattice stress and consequential cracking and crumbling of the alloy particles during cycling, resulting in abrupt loss in capacity within a few charge-discharge cycles. To overcome the above problem, various strategies have been proposed and tested. For example, Sony Corporation has introduced a new lithium ion battery called Nexelion® having an amorphous Sn—Co—C composite as the anode material.

A different approach relies on reducing the size of individual grains in the anode material. US 2007/0020519 A1 (Kim et al.) discloses an anode active material for a lithium ion battery, the material comprising a tin-based nanopowder that is capped with a triazine based monomer. The tin-based nanopowder is reported to have a particle size form about 10 to about 300 nm. Similarly, U.S. Pat. No. 8,192,866 B2 discloses a tin-based anode material containing capped tin nanoparticles.

SUMMARY OF THE INVENTION

In view of the above, it is an object of the present invention to provide an improved tin based anode material. Further objects of the invention are to provide a method for preparing said improved tin based anode material and to provide an improved battery like an improved sodium ion battery and in particular an improved lithium ion battery.

These objects and further advantages are achieved by the anode material, the preparation method and the battery as defined in the respective independent claims.

Advantageous embodiments of the invention are defined in the dependent claims and explained in the description.

According to the present invention, there is provided a tin based anode material for a rechargeable battery, the anode material comprising nanoparticles of composition SnM$_x$O$_y$, wherein M is an element selected from the group consisting of Ni, Cu, In, Al, Ge, Pb, Bi, Sb, Fe, Co, Ga, with 0≤x≤0.5 and 0≤y≤2+2x, the nanoparticles forming a substantially monodisperse ensemble with an average size not exceeding 30 nm and a size deviation not exceeding 15%, the nanoparticles optionally being coated with a capping species.

In the present context, the term "substantially monodisperse ensemble of nanoparticles" shall be understood as a plurality of nanoparticles with a comparatively narrow size distribution that can be expressed in terms of a number density as a function of particle size. According to the invention, the size distribution is characterized by an average size not exceeding a value of 30 nm and by a size deviation not exceeding 15%, wherein the size deviation is defined as the full width at half maximum (FWHM) of the size distribution.

It will be understood that there are various methods for determining size distributions of particle ensembles in the nanometer range. In particular, size distributions may be determined by applying a representative sample of the particles on a suitable substrate, performing transmission electron microscopy (TEM) and carrying out a statistical evaluation of the particle sizes obtained from TEM.

It has been found that a material comprising such a substantially monodisperse ensemble of tin containing nanoparticles according to the present invention is highly useful to form anodes for a rechargeable battery. It will be understood that actual anodes of such a battery will usually contain the tin based material and supplementary materials such as carbon particles. However, the material according to the invention is also useful for other applications.

According to one embodiment (claim 2), the nanoparticles are composed of Sn.

According to another embodiment (claim 3), the nanoparticles are composed of SnO$_2$.

According to a further embodiment (claim 4), the nanoparticles are composed of a Sn core surrounded by a shell of SnO$_2$.

According to yet another embodiment, the nanoparticles are composed of SnCu.

Advantageously (claim 5), the average size of the nanoparticles does not exceed 20 nm. In some embodiments, the average size does not exceed 15 nm, and more preferably it does not exceed 10 nm.

According to an advantageous embodiment (claim 6), the capping species is a sulfur containing species, particularly SH$^-$, SO$_4^{2-}$ or S$^{2-}$. This is particularly useful for producing suspensions of capped nanoparticles in polar solvents such as water.

A method for preparing the tin based anode material according to the present invention comprises the steps of:

a) in a non-aqueous solvent, reacting a tin salt and an organometallic amide reactant and oleylamine, b) adding thereto a transform reactant selected from the group consisting of reducing agents, oxidizing agents and alloying agents, c) adding thereto a precipitating agent, thereby forming a substantially monodisperse nanocrystalline material comprising nanoparticles of composition $SnM_xO_y$ coated with an initial capping layer, d) optionally carrying out a ligand exchange step to provide an inorganically capped nanocrystalline material or an uncapped nanocrystalline material.

The above method was found to be suitable for producing a tin based anode material comprising nanoparticles of composition $SnM_xO_y$ wherein M is an element selected from the group consisting of Ni, Cu, In, Al, Ge, Pb, Bi, Sb, Fe, Co, Ga, with $0 \leq x \leq 0.5$ and $0 \leq y \leq 2+2x$, the nanoparticles forming a substantially monodisperse ensemble with an average size not exceeding 30 nm and a size deviation not exceeding 15%, the nanoparticles optionally being coated with a capping species. It was also found that the above defined method leads to formation of tin containing nanoparticles with a remarkably high shape uniformity. The particles thus formed are all nearly perfectly spherical, or at least have centrosymmetric polyhedral shapes.

The above may be illustrated with the following non-limiting example regarding the preparation of Sn nanoparticles. Starting with a tin salt such as tin chloride, a conversion into an organometallic tin amide is carried out in-situ, followed by a reduction of this tin amide by a reducing agent. The in situ conversion of the tin salt into a tin amide may be affected either by the addition of another metal amide (such as Li-silylamide, Li-alkylamide etc.) or by formation of an alkali metal alkylamide (such as Li-oleylamide) in-situ by a methathesis reaction, e.g. between oleylamide and Li dimethylamide or a similar species. In a subsequent step, oleylamine can be successfully replaced with hexadecylamine and similar long-chain aliphatic amines.

In the course of above steps a) to c), it may be necessary to reach temperatures as high as 140° C. or even higher. Accordingly, the selection of useful non-aqueous solvents is generally limited to comparatively high-boiling solvents, i.e. to solvents having a normal boiling point of at least 140° C. or even higher. Suitable examples to be considered are dimethyl formamide ("DMF") with a normal boiling point of about 153° C. and dimethyl sulfoxide ("DMSO") with a normal boiling point of about 189° C. According to an advantageous embodiment (claim 8), the non-aqueous solvent is oleylamine, which has a normal boiling point of about 364° C. According to another embodiment, the non-aqueous solvent is a mixture of oleylamine and at least one other high-boiling solvent.

There are a large number of tin salts that may be used for the above defined method. Advantageously, the tin salt is selected from the group consisting of tin chloride, tin acetate, tin triflate and tin silylamide (claim 9).

Various organometallic amide reactants are expected to be useful for the above defined method. Advantageously, the amide reactant is $LiN(Si(CH_3)_3)_2$ or $LiN(CH_3)_2$ or lithium oleylamide (claim 10). It has been found that adding an excess of amide reactant, i.e. more than an equimolar amount as compared to the added amount of tin, e.g. a 10-fold excess, is advantageous.

Following reaction step a), the addition of a transform reactant selected from the group consisting of reducing agents, oxidizing agents and alloying agents according to step b) allows for a better control of the nanoparticular tin species that is obtained at the end. In order to form neat metallic tin nanoparticles, it will be useful to add a reducing agent, whereas in order to obtain neat $SnO_2$ nanoparticles it will be useful to add an oxidizing agent. If the tin based anode material shall contain a further element M, i.e. if $x \neq 0$, step b) will comprise the addition of a suitable alloying agent containing said further element M.

According to one embodiment, the reducing agent is diisobutylaluminum hydride or lithium triethylborohydride (claim 11).

According to another embodiment, the oxidizing agent is oxygen or an oxygen/nitrogen mixture or ozone (claim 12).

According to a further embodiment, the alloying agent is a chloride, bromide, acetate, triflate or an organic amide of said element M (claim 13).

Following step b), the preparation method is completed by a precipitation step c) yielding a substantially monodisperse nanocrystalline material comprising nanoparticles of composition $SnM_xO_y$. According to an advantageous embodiment, the precipitating agent is ethanol, methanol, acetone or acetonitrile (claim 14).

The nanoparticles formed in step c) are formed with an initial capping layer. In general the initial capping layer will comprise weakly bound species stemming from the reaction mixture, e.g. oleylamine and/or oleylamide and, if applicable, other solvent molecules.

Depending on the application of interest, it will often be desirable to either remove the initial capping layer or to replace the initial capping layer by another type of capping molecules. Therefore, the optional process step d) comprises a ligand exchange step to provide an inorganically capped nanocrystalline material or an uncapped nanocrystalline material. The term "ligand exchange step" shall be understood here in broad terms: in order to form an uncapped material, the ligand exchange step may simply refer to direct removal of the initial capping layer or it may involve replacing the initially bound species by some other species that is readily removed thereafter.

The present invention also relates to batteries such as a sodium ion battery and in particular a lithium ion battery comprising an anode and a cathode, wherein the anode comprises a tin based anode material as defined above.

BRIEF DESCRIPTION OF THE DRAWINGS

The above mentioned and other features and objects of this invention and the manner of achieving them will become more apparent and this invention itself will be better understood by reference to the following description of various embodiments of this invention taken in conjunction with the accompanying drawings, wherein are shown:

FIG. 12 TEM images and corresponding size-distribution diagrams for SnCu NPs synthesized at different time of the synthesis: a (t=10 sec); b (t=1 h);

DETAILED DESCRIPTION OF THE INVENTION

In the following description of exemplary embodiments, any statements relating to possible explanations or interpretations of observations and results shall not be construed as binding the invention to a particular theory.

1. Monodisperse and Inorganically Capped Sn and Sn/SnO2 Nanocrystals for High Performance Na-Ion and Li-Ion Battery Anodes

1.1 Introduction

This work was driven by two goals: (i) to develop convenient syntheses of colloidal, sub-20 nm Tin (Sn) nanocrystals (NCs) with precise control over the size and composition and (ii) to study the utility of such materials as active anode materials in rechargeable Li-ion batteries (LIBs). In particular, finely tunable morphologies and optimal surface chemistries in nanoscale regime (2-20 nm) on the Li-insertion properties are considered central for achieving high charge/discharge cycling stabilities in the next generation of Li-alloying, high-capacity anode materials such as Sn, Ge and Si [1]. Further, the potential use of Sn and its corresponding oxide SnO$_2$ in a monodisperse, colloidal state is by far broader, including solution-deposited transparent conductive oxides for electronics, photovoltaics and sensors, as well as catalysis, or even as quantum dots (alpha-Tin) or low-temperature catalyst for growing nanowires.

Despite numerous reports on polydisperse (size deviation σ>20%) and/or relatively large (30 to 200 nm) Sn colloids [2], the synthesis of monodisperse, sub-20 nm large Sn NCs remained undeveloped. The low melting point of bulk Sn (231.9° C.) requires the synthesis to be carried out at sufficiently low temperatures using either highly reactive precursors or strong reducing agents.

1.2 Materials and Methods

Figure 1A:
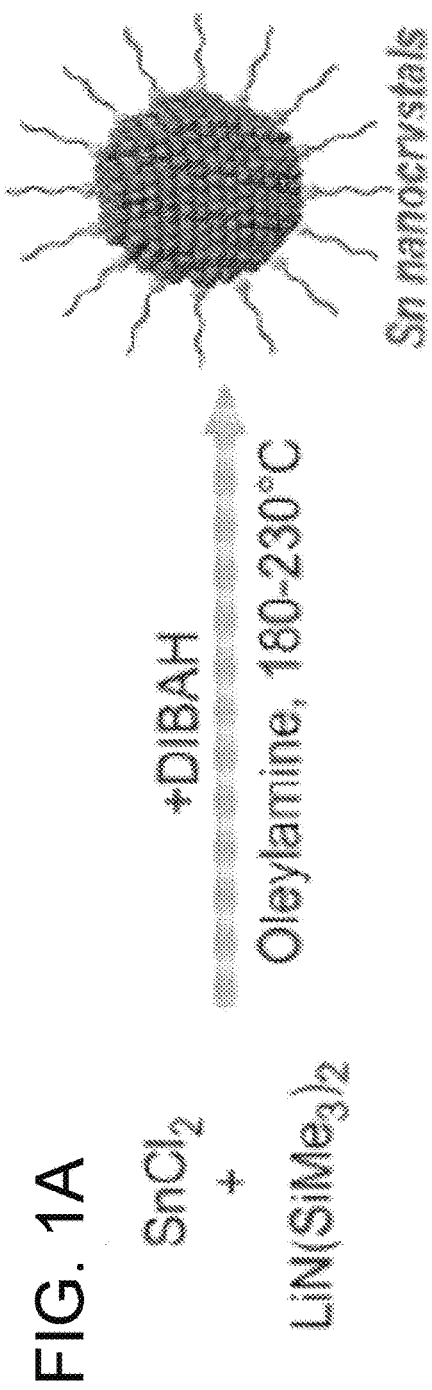
FIG. 1 synthesis of monodisperse Sn NCs: schematics of the reaction (A), representative size-distributions (B), TEM (C, D, E, F) and SEM (G) images.
Figure 1B:
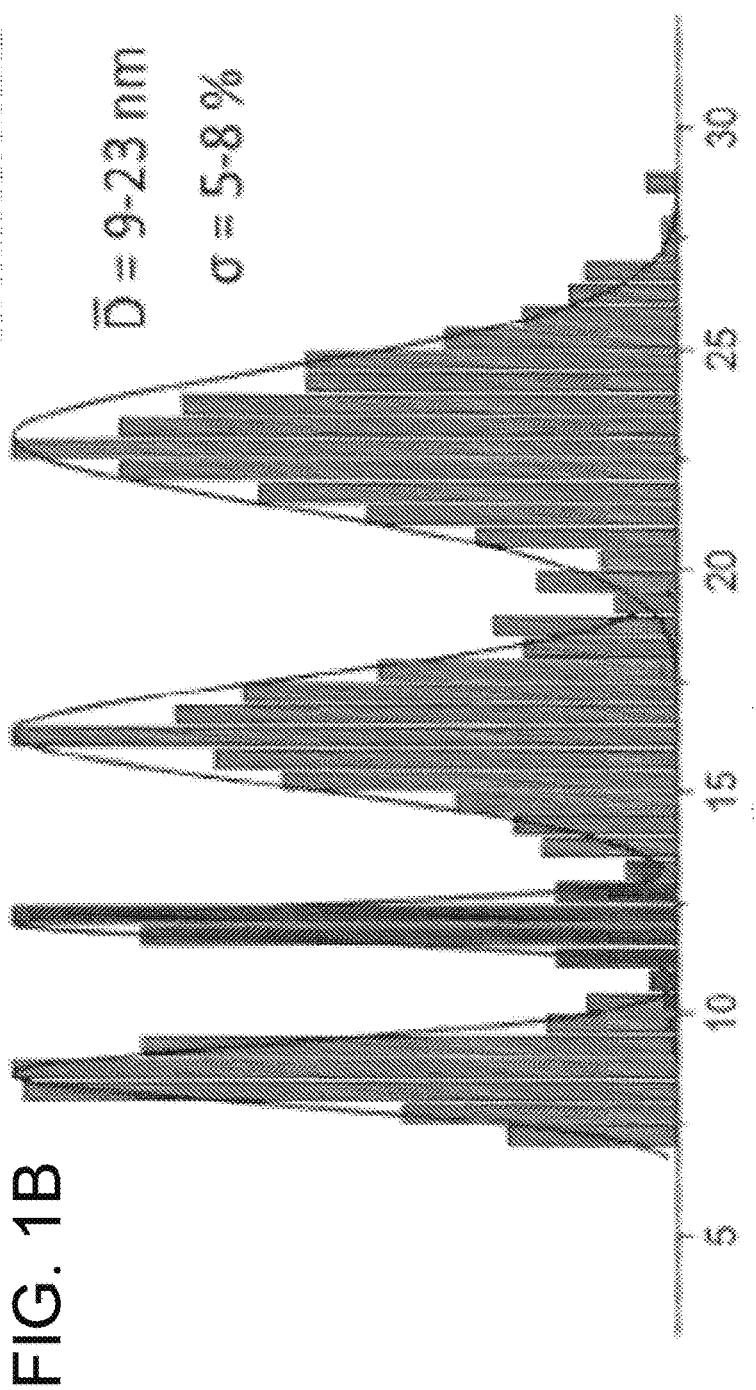

Monodisperse 9 to 23 nm large Sn NCs (FIG. 1, and Table 1 further below) were obtained by consecutive injections of LiN(SiMe$_3$)$_2$ into hot oleylamine solution containing SnCl$_2$ or Sn[N(SiMe$_3$)$_2$]$_2$ at 180-210° C., followed by the reduction with diisobutylaluminium hydride (DIBAH).

Chemicals for Synthesis and Ligand Exchange:

Lithium bis(trimethylsilyl)amide (Li[N(SiMe$_3$)$_2$, 97%, Aldrich), sodium bis(trimethylsilyl)amide (Na[N(SiMe$_3$)$_2$, 95%, Aldrich), potassium bis(trimethylsilyl)amide ((KN(SiMe$_3$)$_2$, 95%, Aldrich), lithium hydride (LiH, 95%, Aldrich), oleic acid (OA, 90%, Aldrich), Tin (II) chloride (SnCl$_2$, anhydrous, 98%, ABCR), Tin (II) trifluoromethanesulfonate (Sn(CF$_3$SO$_3$)$_2$, 97%, Aldrich), Tin acetate (Sn(Ac)$_2$, Aldrich), Bis[bis(trimethylsilyl)amino]tin(II) (Sn[N(SiMe$_3$)$_2$]$_2$, Aldrich), tetrachloroethylene (TCE, ≥99%), Aldrich), octadecene (ODE, 90%, Aldrich), lithium triethylborohydride (superhydride Li(Et$_3$BH), 1.0 M solution in THF, Aldrich), diisobutylaluminium hydride ([(CH$_3$)$_2$CHCH$_2$]$_2$AlH, 1.0 M solution in THF, Aldrich), formamide (FA, ≥99%, Aldrich), acetonitrile (≥99%, Aldrich), oleylamine (OLA, techn., 40%, TCI), potassium sulfide (anhydrous, 95%, STREM) and potassium hydrosulfide (anhydrous, 94%, STREM) were used as received.

Battery Components:

Carbon black (Super C65, provided by TIMCAL), 1 M solution of LiPF$_6$ in ethylene carbonate/dimethyl carbonate (EC/DMC, from Novolyte), 4-fluoro-1,3-dioxolan-2-one (FEC, >98.0%, TCI), Celgard separator (Celgard 2320, 20 μm microporous trilayer membrane (PP/PE/PP), Celgard Inc. USA) and glass-fiber separator (EUJ-grade, Hollingsworth & Vose Company Ltd., United Kingdom), carboxymethyl cellulose (CMC, Grade: 2200, Lot No. B1118282, Daicel Fine Chem Ltd).

Synthesis of Tin Nanoparticles:

In a typical synthesis of 17 nm Sn NCs, oleylamine (OLA, 20 g) was loaded into the three-neck flask and dried under vacuum at 140° C. for 1.5 h under constant stirring. After cooling of oleylamine down to 50° C., the flask was briefly opened to add anhydrous SnCl$_2$ and again dried under vacuum at 140° C. for 30 min. In parallel, Li[N(SiMe$_3$)$_2$ (3.6 mmol, 0.601 g) was solved in 2 ml toluene in glovebox. The temperature of SnCl$_2$/OLA was raised to 180° C. under argon, followed by the injection of Li[N(SiMe$_3$)$_2$/toluene solution, and, in 10 s, 0.6 mL of 1M DIBAH solution in THF. The solution immediately turned dark brown upon injection of DIBAH. 1 h later, the reaction solution was quickly cooled down to room temperature using water-ice bath. Upon cooling, at about 120-150° C., 10 ml of anhydrous toluene were added. After cooling, Sn NCs were precipitated by adding 40 ml of ethanol following by their centrifugation at 8,000 rpm for 4 min. The Sn NCs were redispersed in tetrachloroethylene (TCE) solution of oleic acid (~6 mL, 1 ml OA/50 ml TCE) to replace the weakly bound OLA molecules. Finally, the Sn NCs were precipitated second time by 10 ml of ethanol, centrifuged and redispersed in common nonpolar solvents such as TCE, chloroform or toluene forming long-term stable solutions.

Figures 2A, 2B, 2C:
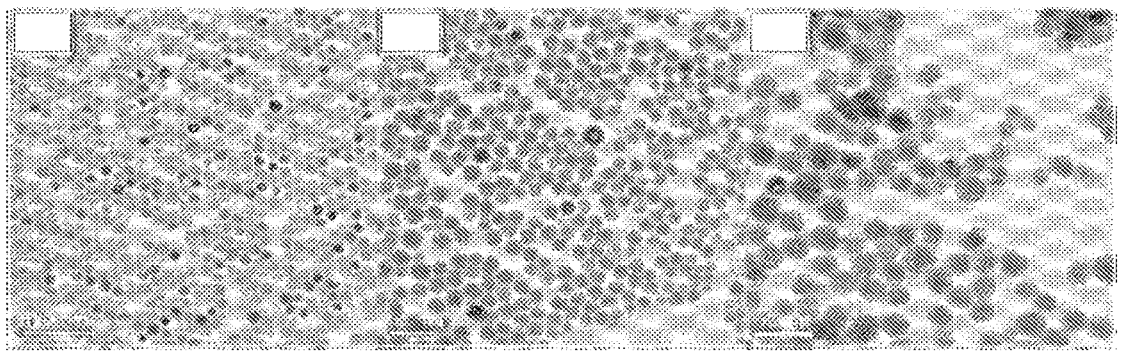
FIG. 2 TEM images of Sn NCs synthesized from $SnCl_2$ using $LiNMe_2$(A), $NaN(SiMe_3)_2$(B), $KN(SiMe_3)_2$(C), LiH (D) and DIBAH as reducing agent; and via $LiN(SiMe_3)_2$-based synthesis with superhydride (E) and boran-tert-butylamine complex (F) as reducing agents.
Figures 2D, 2E, 2F:
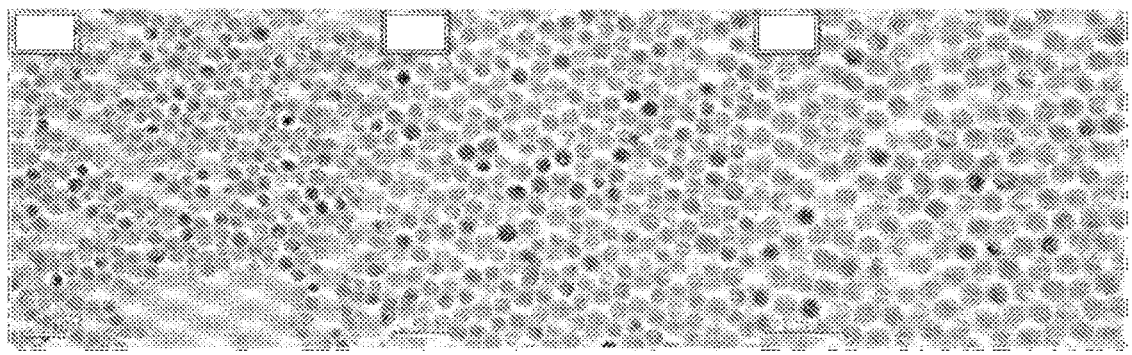
Figures 3A, 3B, 3C:
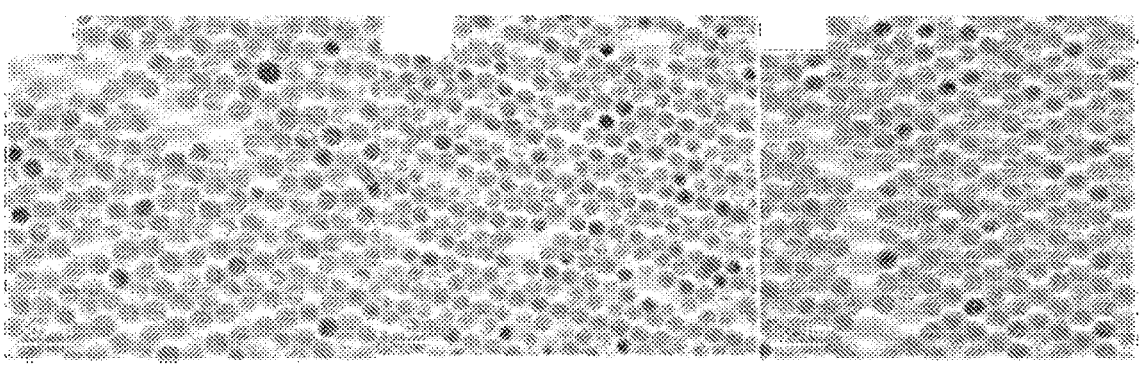
FIG. 3 TEM images for Sn NCs synthesized using various Tin(II) precursors, while keeping $LiN(SiMe_3)_2$ and DIBAH in all cases: (A) $Sn(Ac)_2$, (B) $Sn(CF_3SO_3)_2$ and (C) $Sn[N(SiMe_3)_2]_2$.

Further Remarks on the Synthesis:

(i) Identical results, in terms of the size and quality of Sn NCs, were obtained using sodium and potassium silylamides, lithium hydride and other strong bases such as $LiNMe_2$ (FIG. 2), as well as other oleylamine-soluble Sn(II) precursors such as $Sn[N(SiMe_3)_2]_2$, $Sn(Ac)_2$ and $Sn(CF_3SO_3)_2$ (FIG. 3).

Figure 4:
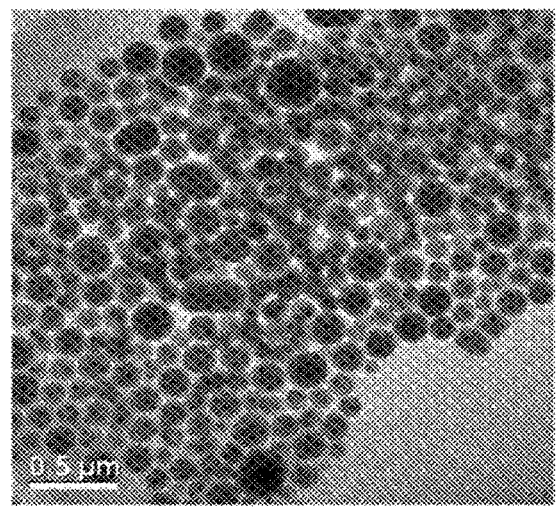
FIG. 4 TEM image of Sn precipitate collected after direct injection of DIBAH into $SnCl_2$/OLA solution, without $LiN(SiMe_3)_2$.

(ii) No NCs could be formed without amide bases: only polydisperse, 100-300 nm large particles were formed upon the injecting of DIBAH into $SnCl_2$-oleylamine solution directly (FIG. 4).

(iii) Sn NCs of similar quality can be obtained using superhydride or borane tert-butylamine complex as reducing agent (FIG. 2).

Figures 5A, 5B:
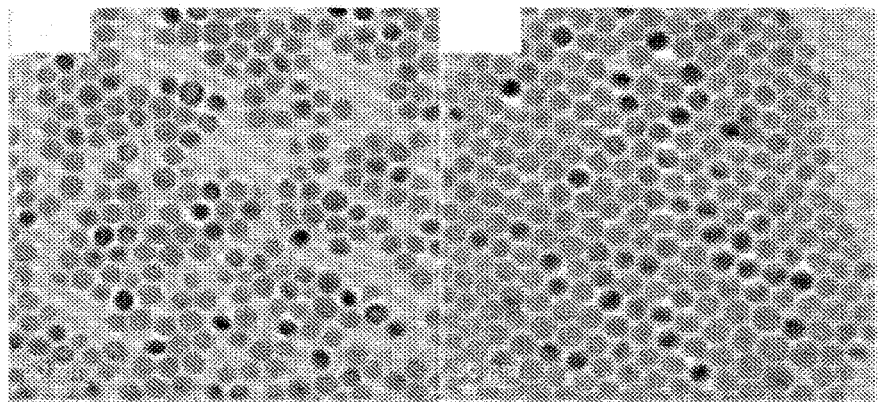
FIG. 5 TEM images for Sn NPs synthesized at different synthesis temperature: A(130° C.); B(150° C.); C(180° C.); D(210° C.) using reaction time of ~1 h.
Figures 5C, 5D:
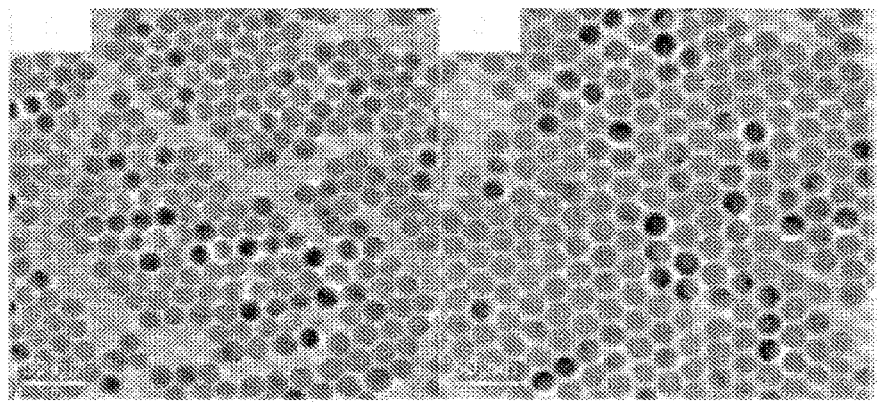
Figures 6A, 6B:
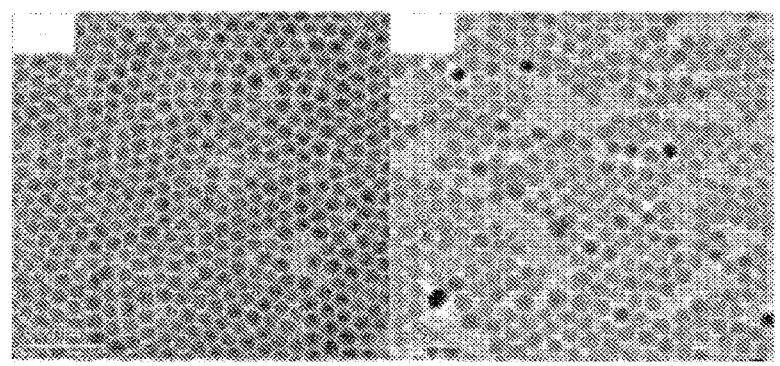
FIG. 6 TEM images for Sn NPs synthesized at T=180° C. using different reaction time: A (10 sec); B(1 min); C(5 min); D(1 h); E(6 h); Images F and G correspond to the sample obtained at T=210 and T=230° C. using reaction time of ~6 h.
Figures 6C, 6D:
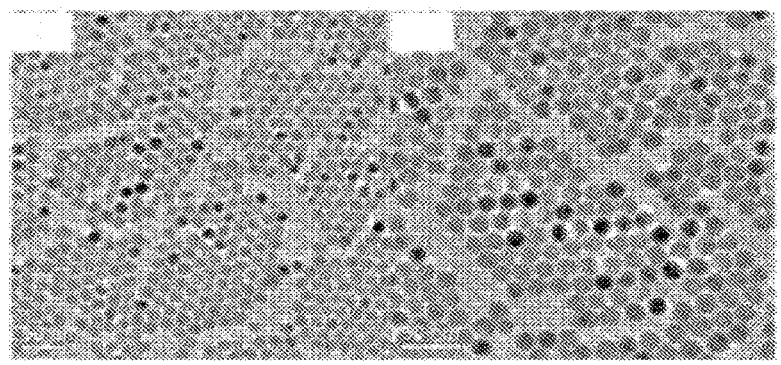
Figures 6E, 6F:
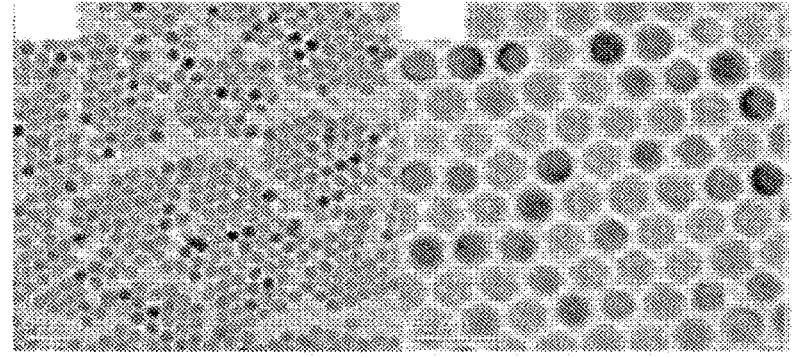
Figure 6G:
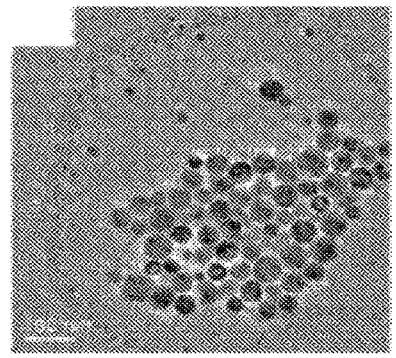

(iv) By varying the synthesis temperatures (T=130-250° C.) and time (t=10 sec-6 h), it has been determined that Sn NCs of the best quality can be obtained in the temperature range of 180-210° C. At lower temperatures, the range of size distribution of Sn NPs was much broader for the same time of reaction of ~1 h (FIG. 5). By taking aliquots at different time intervals and examining them with TEM (FIG. 6), the optimal reaction time of ~1 h was revealed what allows to obtain monodisperse Sn NPs of 16-17 nm. Suggested optimal reaction conditions for a given batch volume can be found in Table 1.

TABLE 1

Experimental conditions in the synthesis of Sn NCs

| # | Mean size, nm | σ, % | T(inj), ° C. | OLA, g | $SnCl_2$, mmol | LiNTMS, mmol | DIBAH, mmol | Reaction time |
|---|---|---|---|---|---|---|---|---|
| 1 | 9 | 8.3 | 180 | 20 | 0.5 | 3.6 | 0.6 | 10 sec |
| 2 | 12 | 5.9 | 210 | 20 | 0.5 | 3.6 | 0.6 | 10 sec |
| 3 | 17 | 7.7 | 180 | 20 | 0.5 | 3.6 | 0.6 | 1-4 h |
| 4 | 23 | 7.6 | 210 | 20 | 0.5 | 3.6 | 0.6 | ≥6 h |

Ligand Exchange with $K_2S$ or KHS:

For a typical ligand exchange using $S^{2-}$ or $HS^-$ ions, 1 mL of Sn NCs in TCE (~5 mg/mL) was mixed with 1 mL of $K_2S$ or KHS solution in FA (5 mg/mL). The mixture was stirred for about 1 h min leading to a complete phase transfer of Sn NCs from TCE to the FA phase. The FA phase was separated and triply washed with toluene to remove any remaining nonpolar organic species. Then, Sn NCs dispersed in FA phase were precipitated by adding ~1 mL of acetonitrile. Obtained suspension was centrifuged at 8000 rpm for 4 min and then precipitate was redispersed in DI water.

Characterization:

Transmission Electron Microscopy (TEM) images data were obtained using a Philips M30 operated at 300 kV. Carbon-coated TEM grids from Ted-Pella were used as substrates.

The size of NCs was determined by PEBBLES software in automatic mode for at least 100 NCs per each sample [3]. Size deviations of NCs were calculated via formula (1) using a Gaussian fit of measured NCs, $$S = \frac{FWHM}{2d} \times 100 \, [\%]$$

where FWHM is the full width at half maximum of the Gaussian fit and d is the diameter of NCs at the maximum of the Gaussian fit.

The oxygen content of inorganically capped and uncapped $Sn/SnO_2$ was determined by Moessbauer spectroscopy.

Preparation of Sn-Based Anodes and Electrochemical Testing:

In a typical electrode preparation, carbon black (CB) was stirred with 0.2 wt % carboxymethyl cellulose (CMC) water solution for 10 min. The resulting suspension was ball-milled for 1.5 h and mixed with appropriate amount of the freshly prepared aqueous dispersion of $Sn/SnO_2$ NCs with known concentration. Obtained homogeneous suspension was drop-cast and dried on Ti current collector (13 mm diameter) to provide coverage of approximately 3 mg/cm². Two weight compositions were tested:

$Sn/SnO_2$(30%):CB(45%):CMC(25%)

and $Sn/SnO_2$(63.75%):CB(21.25%):CMC(15%).

All electrochemical measurements were conducted in homemade, reusable and air-tight coin-type cells. Test cells were assembled in an Argon-filled glovebox with water and oxygen content below 1 ppm. Lithium metal served as both reference and counter electrode. An active electrode was covered with elgard separator membrane and a glass fiber separator of 1 mm thickness was placed between working and reference electrode. As an electrolyte, mixture of ethylene carbonate and dimethyl carbonate 1:1 (w/w), with 1M $LiPF_6$ was used. Optionally, 3% flouroethylene carbonate was added to improve cycling stability. All charge-discharge tests and cyclic voltammetry scans were conducted on a MPG2 multi-channel workstation (Bio Logic).

1.3 Results

Figure 7A:
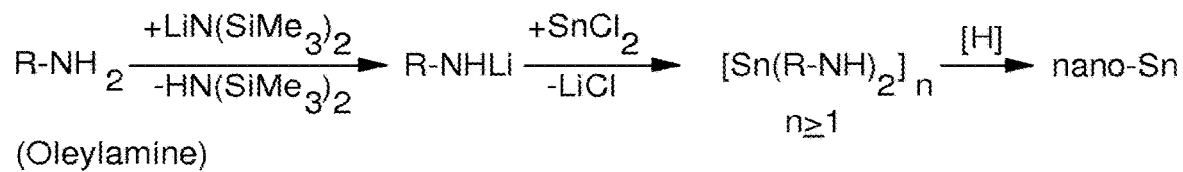
FIG. 7 proposed mechanism of precursors-to-metallic Sn conversion derived from NMR studies.
Figure 7B:
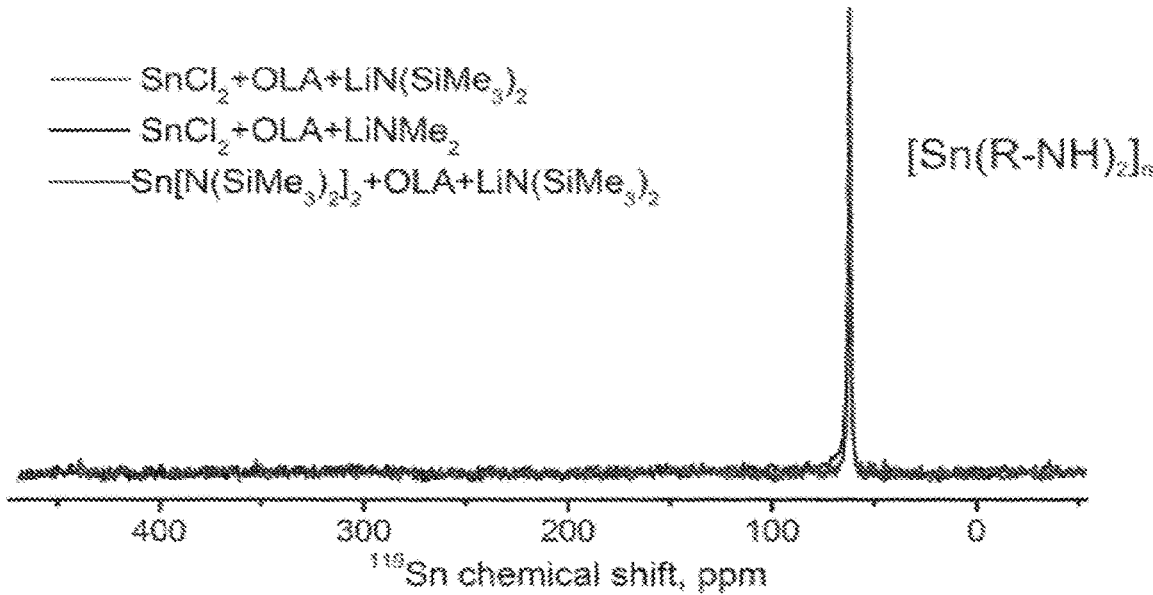

The use of inexpensive $SnCl_2$ and $LiN(SiMe_3)_2$ was conceived from the possibility of the convenient in-situ formation of $Sn[N(SiMe_3)_2]_2$. Instead, the $^{119}Sn$ NMR spectra, taken at various stages of the synthesis, show that in-situ or ex-situ prepared $Sn[N(SiMe_3)_2]_2$ is not an actual precursor (FIGS. 7A and 7B). Regardless of the starting Sn(II) compound (chloride, acetate, triflate or silylamide), addition of lithium dimethylamide or silylamide leads to the same Tin-oleylamido derivatives. A different reaction mechanism is thus plausible—an in-situ formation of metal-oleylamide species. An important role of $LiN(SiMe_3)_2$ appears to be to act as a strong base for deprotonating oleylamine. Li-oleylamide then quickly reacts with $SnCl_2$ generating Sn-oleylamide—an actual precursor for the final reduction step. Identical results, judging from $^{119}Sn$ NMR spectra, reaction rates and in terms of the size and quality of Sn NCs, were obtained using sodium and potassium silylamides, lithium hydride and other strong bases such as LiNMe$_2$, as well as other oleylamine-soluble Sn(II) precursors such as Sn[N (SiMe$_3$)$_2$]$_2$, Sn(Ac)$_2$ and Sn(CF$_3$SO$_3$)$_2$. In agreement with the above reasoning, no NCs could be formed without amide bases: only polydisperse, 100 to 300 nm large particles are formed upon the injecting of DIBAH into SnCl$_2$-oleylamine solution directly. Very likely, metal-oleylamide may act not only as a precursor but also as surface capping layer during the NC nucleation and growth (rather than neutral OLA molecules), in analogy to the dual role of metal-carboxylates and phosphonates in common NC syntheses.

Figures 8A, 8B:
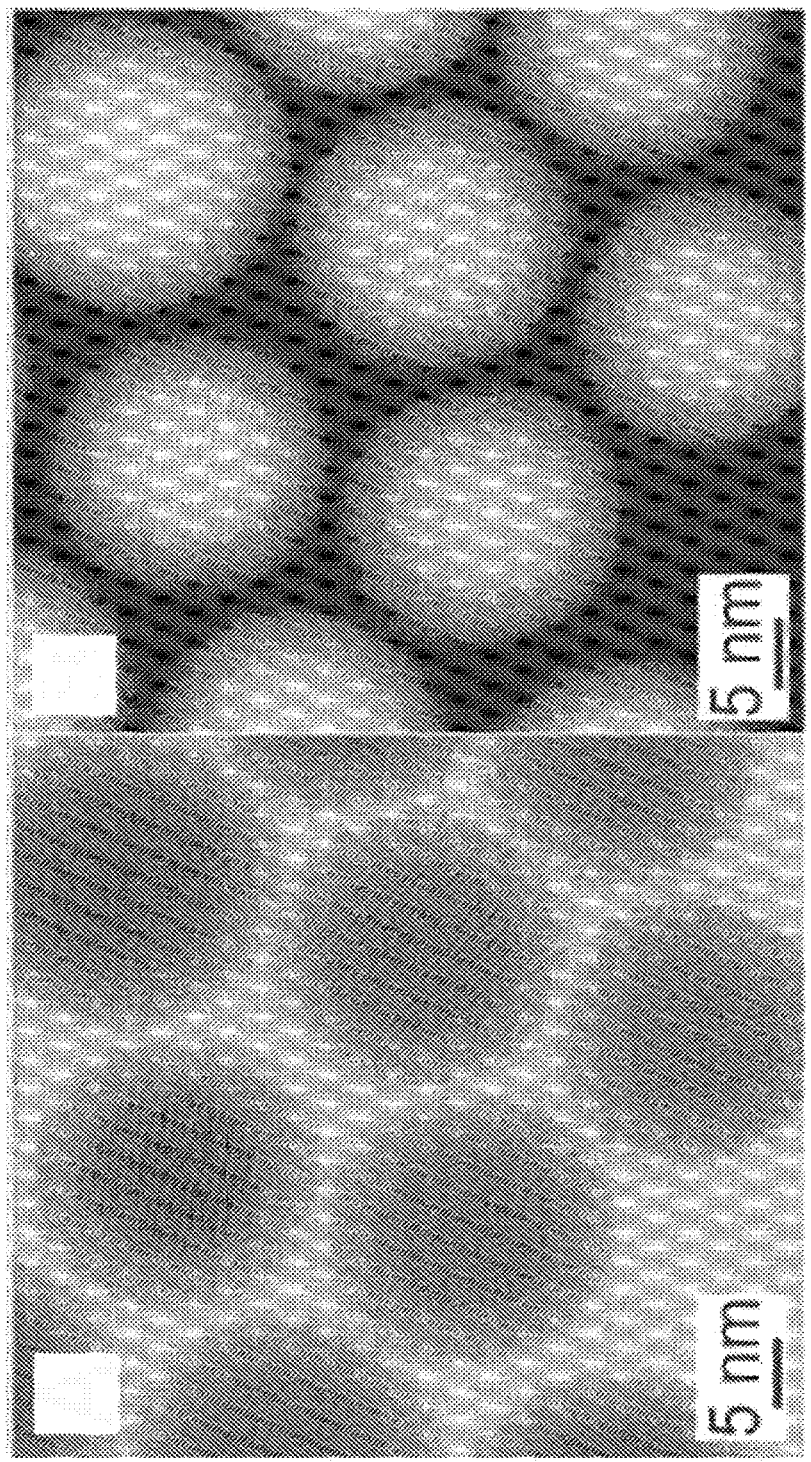
FIGS. 8 (A) bright field—(BF) and (B) high-angle annular dark-field (HAADF) STEM images, (C) powder XRD pattern and (inset in C)$^{119}$MAS NMR spectrum of colloidal Sn/SnO$_2$ NCs; vertical lines in (C) mark the diffraction pattern of bulk beta-Sn; blue curve is the fit obtained by Rietveld refinement.
Figure 8C:
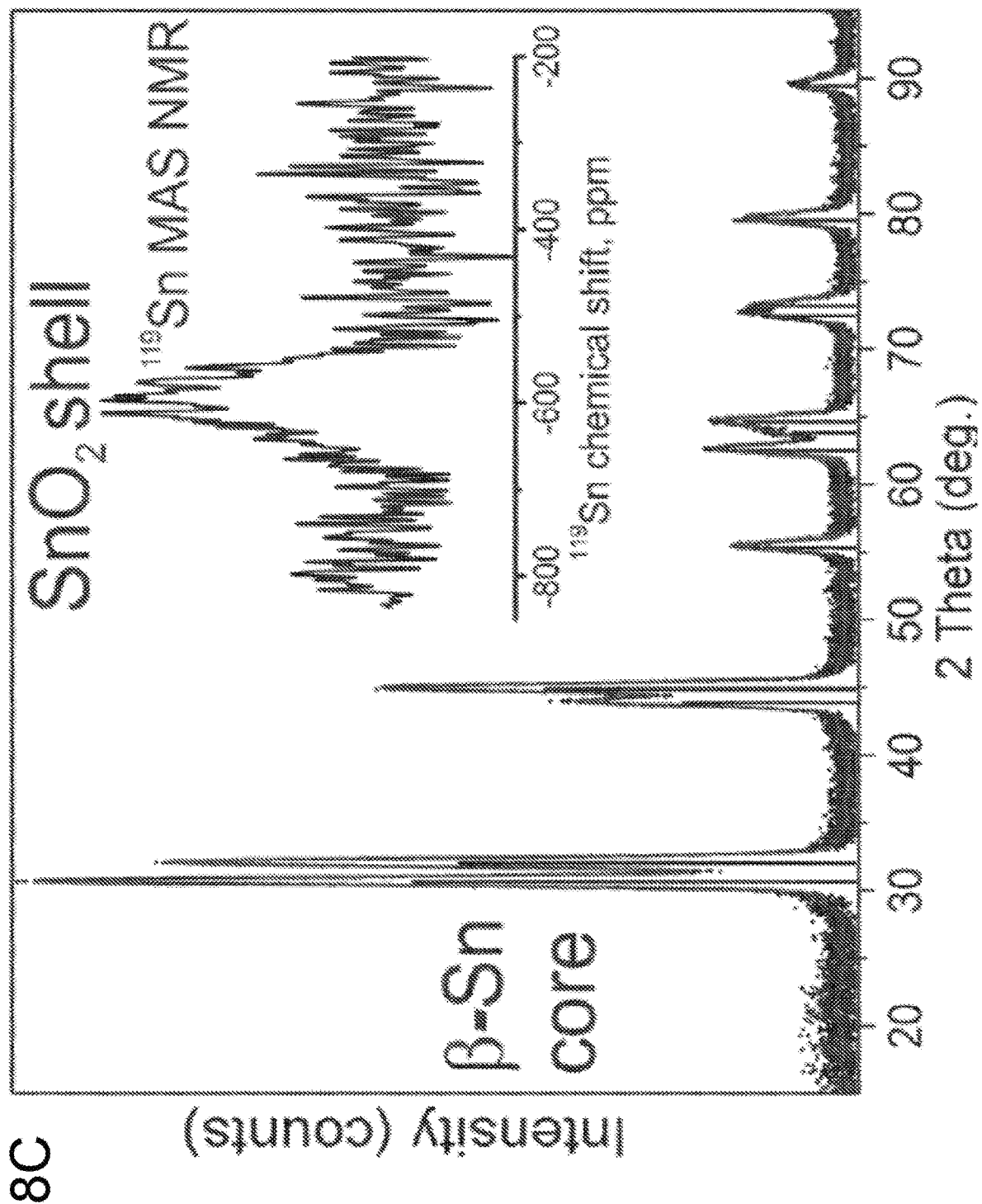

Following the nucleation and growth under airless conditions, the isolation and purification of Sn NCs was carried out in air. Oleic acid was added to replace weakly bound oleylamide/oleylamine species (as documented by FTIR spectra not shown here). High-resolution bright field (BF) scanning transmission electron microscopy (STEM) (FIG. 8A) and high-angle annular dark field (HAADF) STEM images of Sn NCs (FIG. 8B) indicated a single-crystalline core covered by the amorphous oxide shell formed upon the air-exposure. Powder X-ray diffraction patterns (FIG. 8C) confirmed that NCs cores are single-crystalline beta-Sn (I 41/amd space group, a=0.58308, c=0.31810 nm) [4] without detectable crystalline Sn-oxide phases. To determine which oxide (SnO or SnO$_2$) is at the surface, solid state magic angle spinning (MAS)$^{119}$Sn NMR measurements were taken. NMR spectra contained single broad peak at ca. −600 ppm, commonly reported for amorphous SnO$_2$, and no detectable SnO (expected at −208 ppm) [5]. The peak broadening of up to 100 ppm is similar to the reports for sub-10 nm SnO$_2$ nanoparticles and hollow nanospheres [6], while much narrower peaks (<10 ppm linewidths) are found in bulk crystalline SnO$_2$ [5].

Figures 14A, 14B:
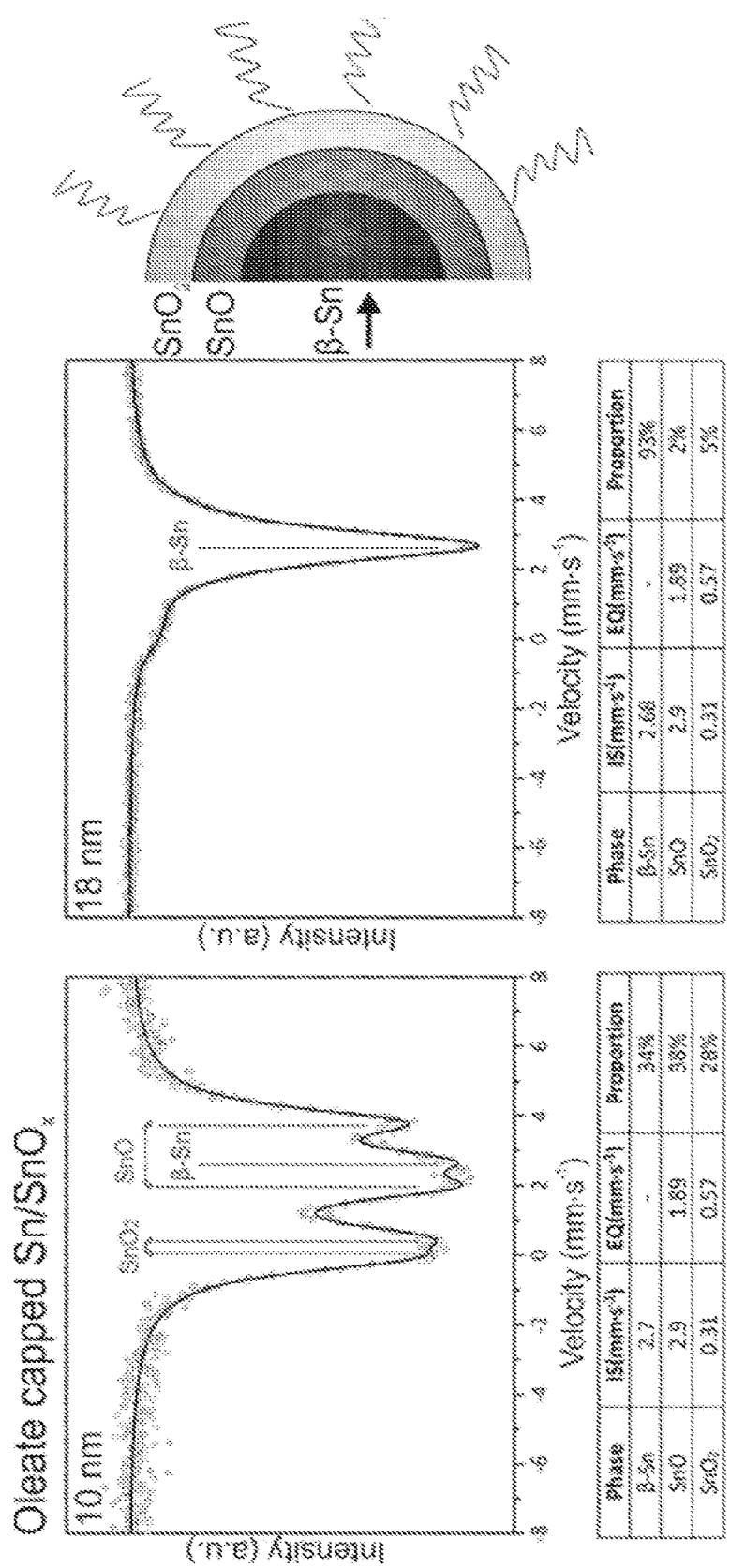
FIGS. 14A-14D Moessbauer spectra of inorganically capped and uncapped Sn/SnO$_2$.
Figures 14C, 14D:
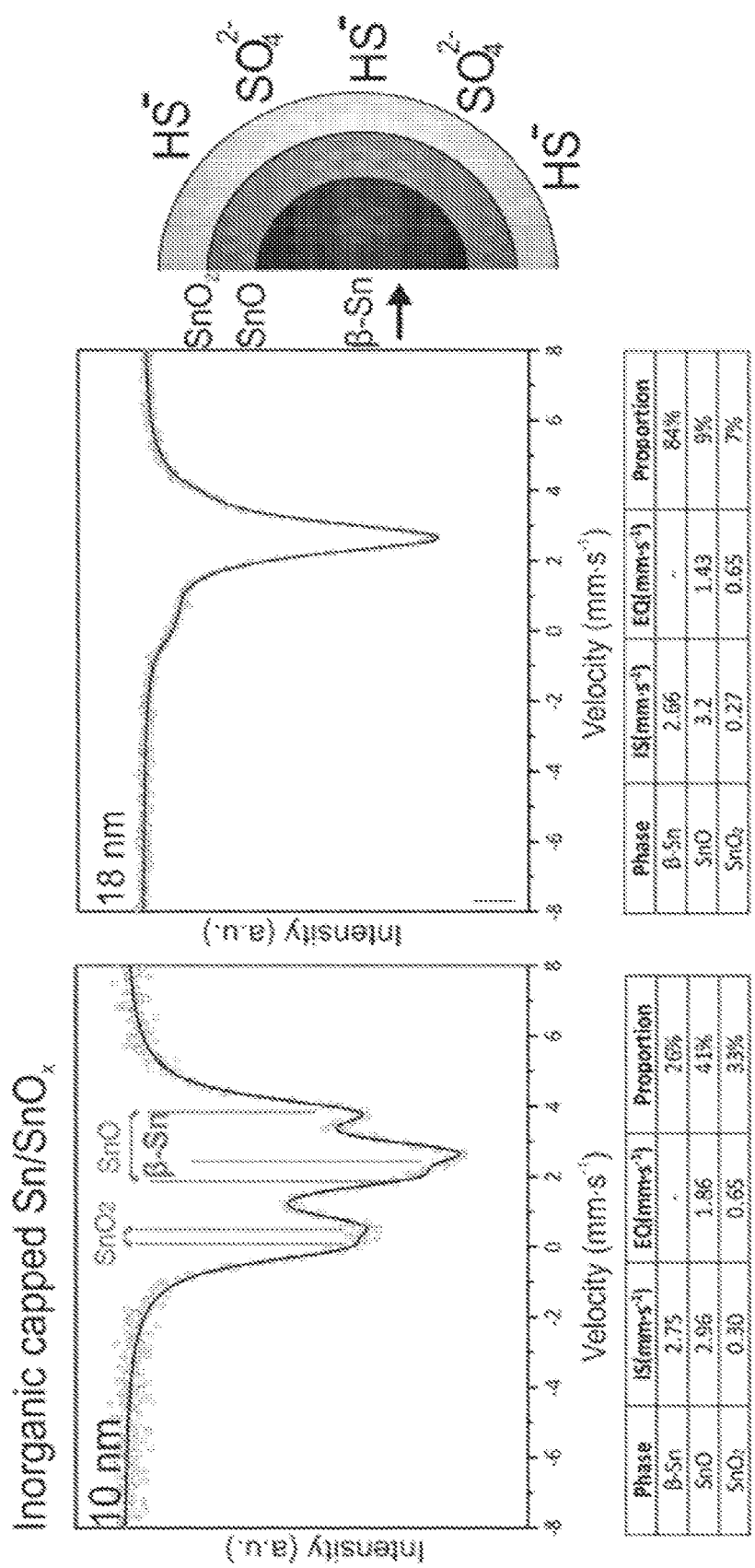

Additional information on the oxide shell was obtained by Moessbauer spectroscopy as shown in FIG. 14. In a depth of 10 nm (FIG. 14A and FIG. 14C) characteristic bands for both oxides, SnO and SnO$_2$, and Sn are found that allow the calculation of respective amounts. In a depth of 18 nm (FIG. 14B and FIG. 14D) almost no oxides are found anymore for both oleate capped (FIG. 14A and FIG. 14B) and inorganically capped Sn/SnO$_2$ (FIG. 14B and FIG. 14D).

Figure 9A:
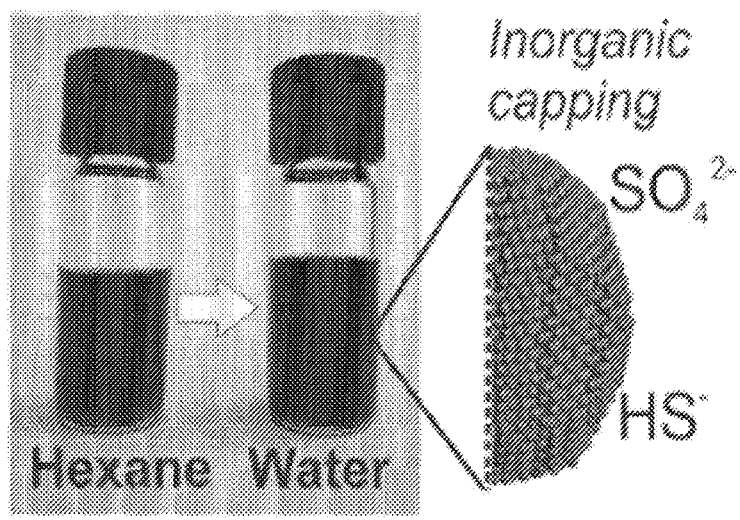
FIGS. 9 (A) photographs and (C) electrophoretic mobility and (D) of Sn NC dispersion before and after ligand-exchange; (B) TEM image of HS$^-$/SO$_4^{2-}$ stabilized Sn NCs; (D) ATR-FTIR spectra of Sn NCs after ligand-exchange.
Figure 9B:
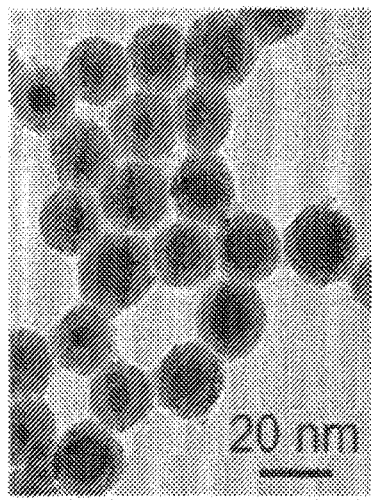
Figure 9C:
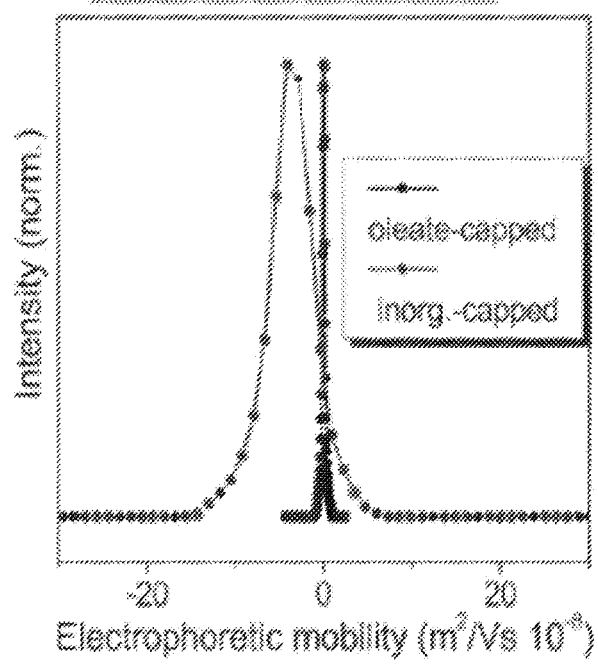
Figure 9D:
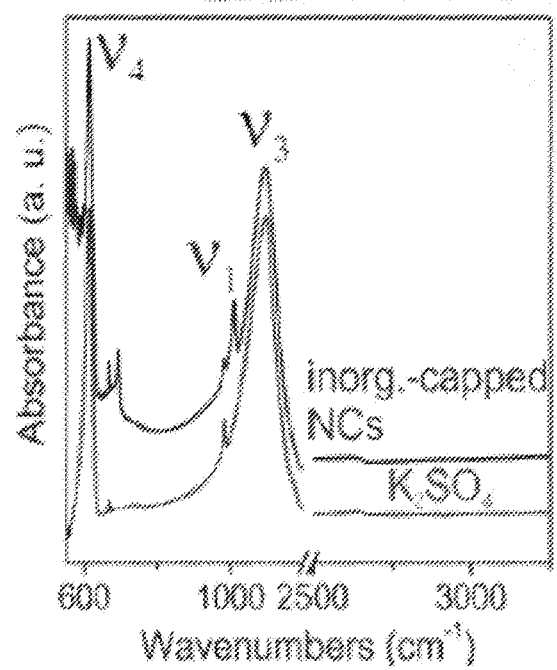

As expected, due to high insulating barriers created by hydrocarbon chains, oleate-capped Sn NCs turned to be unusable for Li-ion batteries, showing negligible discharge capacities of about 20 mAh/g. Therefore, an inorganic capping approach was used, in which small inorganic ions such as SH$^-$ and S$^{2-}$ are applied via a phase-transfer, ligand-exchange reaction. First, NCs dispersed in hexane or tetrachloroethylene were treated with KHS solution in formamide (FA) leading to the fast and complete phase transfer of NCs into FA solution. Then, NCs were precipitated with acetonitrile and re-dispersed in water, forming concentrated and stable colloidal solutions (FIG. 9A). While preserving the size and shape of NCs (FIG. 9B), ligand-exchange also leads to the change of the mechanism of colloidal stabilization from steric repulsion with zero surface charge to electrostatic repulsion with negative surface potential (FIG. 9C).

Figure 10:
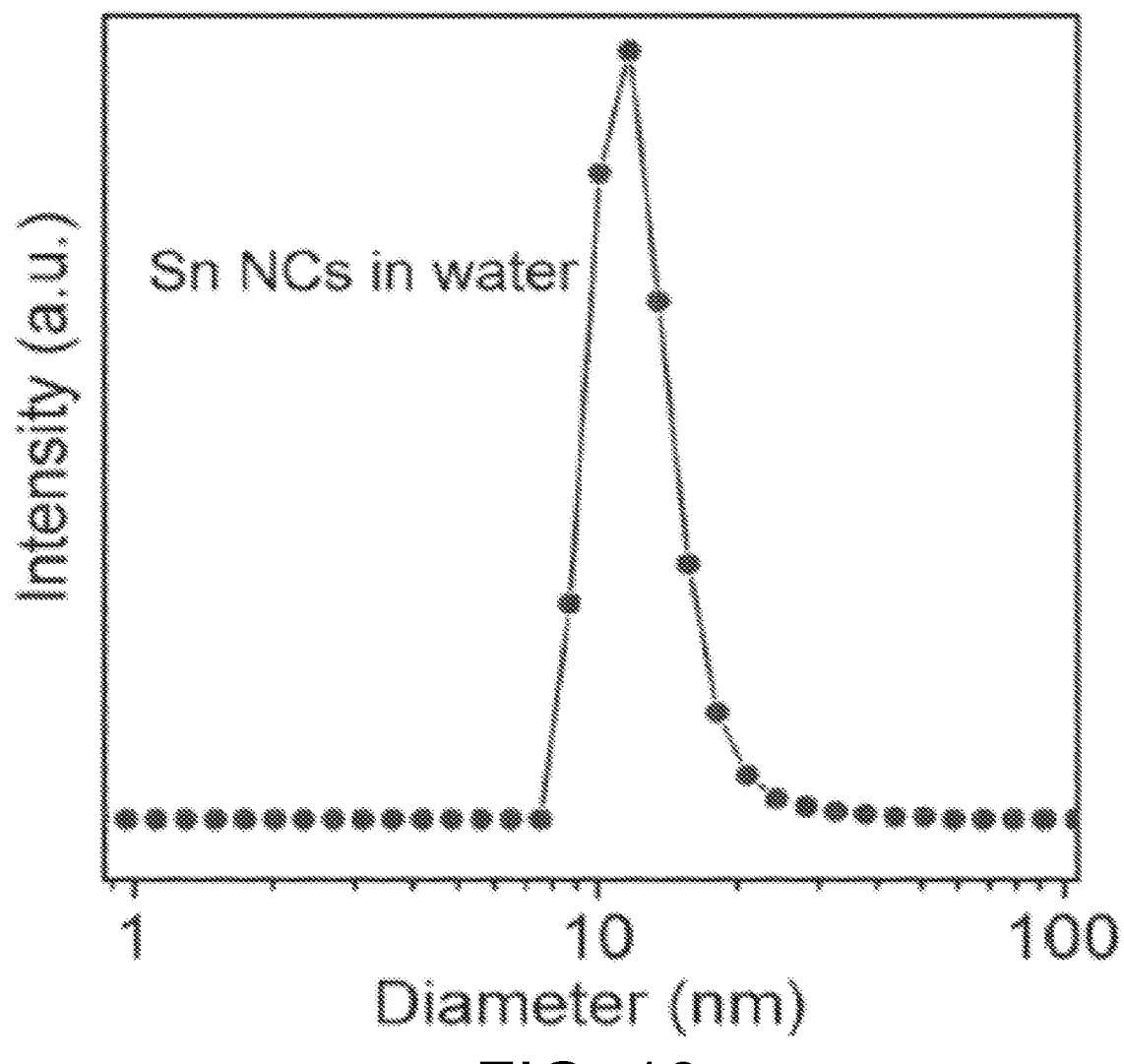
FIG. 10 distribution of scattering intensity vs. hydrodynamic diameter obtained by dynamic light scattering.

FTIR spectra indicate complete removal of organic ligands, as no signal can be detected in 2,800-3,000 cm$^{-1}$ region (CH-vibrations). Instead, NCs appear to be covered with sulfate ions SO4$^{2-}$. Two major bands are associated with $v_3$ (1,110 cm$^{-1}$) and $v_4$ (618 cm$^{-1}$) vibrations of SO4$^{2-}$, [7] found at the same positions for the NCs and for reference K$_2$SO$_4$. The position of the weak $v_1$ (982 cm$^{-1}$) band is also found in both spectra. The frequency of $v_1$ is known to be variable in the 980 to 1,020 cm$^{-1}$ range, often without considerable shifts of $v_3$ and $v_4$. [7b]. Thus, a second weak line at 1,010 cm$^{-1}$ may be attributed to $v_1$ of surface-bound SO$_4^{2-}$. The large amounts of SO$_4^{2-}$ most likely originate from the oxidation of S$^{2-}$ photocatalyzed by surface SnO$_2$. Dynamic light scattering (DLS) measurements confirmed that HS$^-$/SO$_4^{2-}$ capped Sn/SnO$_2$ NCs possess true colloidal stability with single-particle size distributions (FIG. 10).

The typical major problem of Sn-based Li-battery anodes (also for Si and Ge) is mechanical failure due to the huge volume change of up to 400% upon full lithiation to Sn$_5$Li$_{22}$ (corresponding to a theoretical capacity of 992 mAh/g). The use of nanostructured materials is presently considered as the most efficient way to tackle this problem. Since the NCs produced as described above are of core/shell morphology, the contribution of SnO$_2$ may reduce achievable capacity to 780 mAh/g (for pure SnO$_2$) due to the initial irreversible reaction (2):

$$SnO_2 + 4Li \rightarrow 2Li_2O + Sn \qquad (2)$$

This Li$_2$O shell, however, is widely considered to be very helpful in buffering the volume changes.

For a close-related case of Si nanoparticles, undergoing similar volume changes during electrochemical cycling, Tarascon et al. showed that simple composite active sphere (e.g. Si)-inactive/elastic matrix (carbon additive) may exhibit significantly improved cycling stabilities when the mass load of the active materials is not exceeding 20-30% [8]. Thus, our initial electrochemical studies (FIG. 11A-11C) are carried out on NC diluted in the amorphous carbon matrix NCs/Carbon/Binder=30%:45%:25%). High colloidal stability of Sn/SnO$_2$ NCs in water was of great aid for efficient mixing of these NCs with sodium carboxymethylcellulose (CMC for simplicity) as a water soluble binder and carbon black as conductive additive. The resulting homogeneous dispersions were used for depositing active anode materials for standard laboratory electrochemical tests (coin-type Li-ion batteries).

The half-cells were cycled in the range of 5 mV to 2V, which can be considered as ultimately deep charging/discharging and measured values are normalized to the content of Sn-based nanomaterial. It should be noted that any narrower voltage range would give substantially higher capacity retention upon cycling. Further, relatively high charge/discharge rates of 1,000 mA/g (1 to 2 C depending on capacity) were used, comparable to those required for automotive applications of Li-ion batteries. Unlike to organic-capping, fully inorganic NCs allow high reversible discharge capacities of up to $C_{Sn}^{max}$=1,000 mAh/g (Sn content) for the cells containing 30 wt % Sn (FIG. 11A). This value is envisioned as an upper estimate assuming that carbon is inactive. A more conservative estimate of $C_{Sn}^{min}$=700 mAh/g can be deduced by assuming that carbon's capacity of ~200 mAh/g (measured separately under identical conditions) is retained in the mixture with NCs. Further, practically useful values are also the capacity related to the total mass of the electrode, $C^{total}$=300 mAh/g, and the total volumetric capacity of $C_v^{total}$=585 mAhcm$^{-3}$ (electrode density is 1.95 g/cm$^3$). The cyclic voltammograms (FIG. 11C) are very typical for those obtained with nanogranular SnO$_2$. During the first discharge, a cascade of reduction waves correspond to (from higher to lower potential): the reduction of SnO$_2$ to Sn, formation of the solid-electrolyte interface (SEI) and alloying of Sn with Li. The reduction peaks at 0.25-0.7 V are assigned to the formation of Li$_2$Sn$_5$, LiSn, Li$_7$Sn$_3$, Li$_5$Sn$_2$, Li$_{13}$Sn$_5$, Li$_7$Sn$_2$, Li$_{22}$Sn$_5$. A broad peak, centered at 0.5 V in a positive current range (charge), includes all processes of de-alloying. For achieving best cycling stability, fluoroethylenecarbonate (FEC) additive was added, leading to the retention of 85 to 90% of the 20 s-cycle capacity after 100 cycles (FIG. 11B).

Figure 11D:
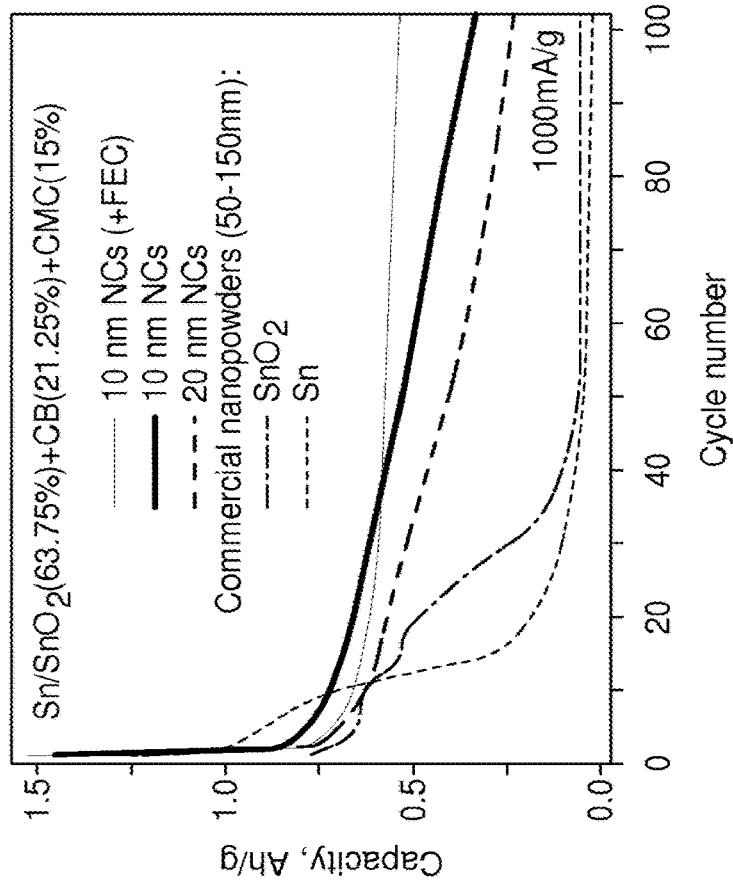
FIG. 11 (A) galvanostatic discharge profiles in the voltage window of 0.005 to 2V for anodes based on 10-nm large Sn/SnO$_2$ NCs; (B) cyclic voltammograms for the initial five charge-discharge cycles for electrodes using 10 nm Sn/SnO$_2$ NCs, collected at a rate of 0.1 V/s; (C) reversible discharge capacities for anodes containing 30 wt % Sn/SnO$_2$ NCs; (D) reversible discharge capacities for anodes at a high mass content of 63.75% of active Sn-based material (nanocrystals and commercial powders); (E) reversible discharge capacities for anodes at a low mass content of 30% of active Sn-based material (nanocrystals and commercial powders); capacities are related to the content of an active material.
Figure 11C:
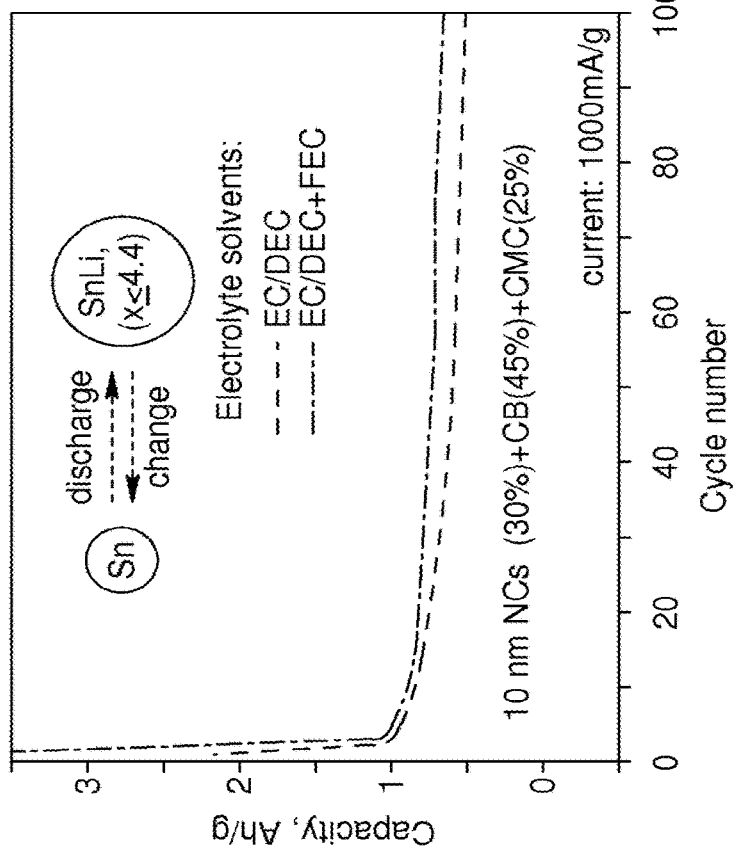
Figure 11E:
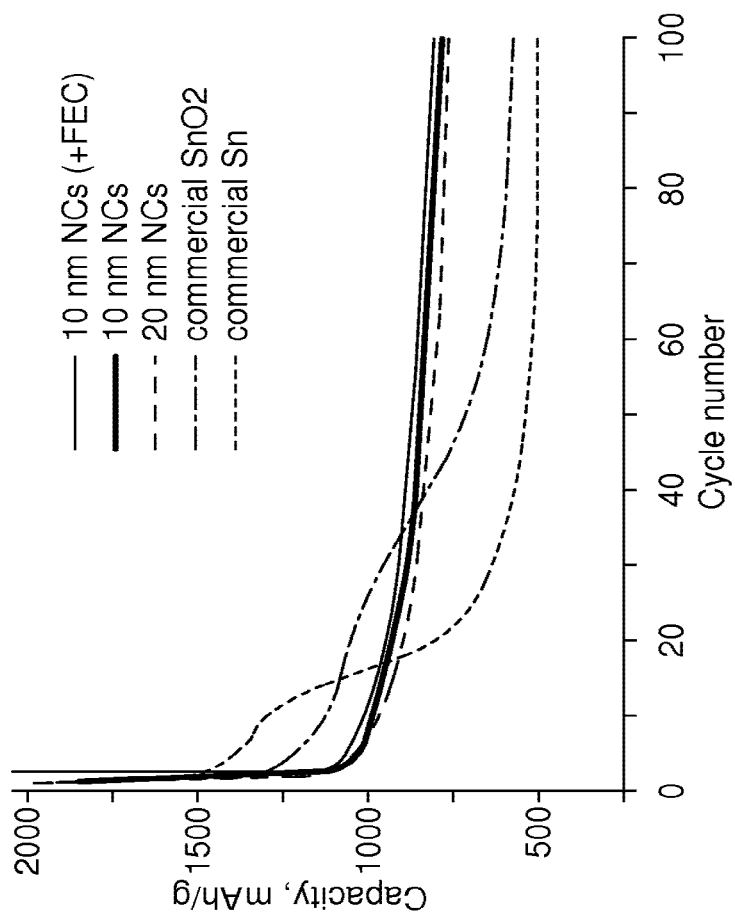

Overall, the comparison of electrochemical data in numerous reports (reversible capacities and their retentions) for Sn-based anodes or similar materials has to be taken with caution and may be completely misleading. Direct and practically meaningful comparison can be drawn only when the electrodes contain the same volume fraction of the active material, have comparable density and thicknesses and are studied under identical electrochemical conditions (voltage windows, charge/discharge rates, temperature, electrolytes). With this in mind, a fundamental question regarding the effect of the nanocrystal size and, therefore, the importance of the precision synthesis of Sn-based NCs for improving Li insertion properties was approached. For this purpose, electrodes containing 10 nm and 20 nm NCs were compared with the commercial Sn and $SnO_2$ nanopowders (Aldrich, 50 to 150 nm). Furthermore, for having technologically relevant formulations of electrodes, the content of Sn-based NCs was increased to ~64 wt % (FIG. 11D). Under these conditions and after 100 cycles, only 10 nm large Sn/$SnO_2$ NCs were able to retain capacities of $C^{Sn}_{max}$=600 mAh/g, $C^{min}_{Sn}$=443 mAh/g, $C^{total}$=383 mAh/g and $C^{total}_v$=1,111 mAhcm$^{-3}$ (electrode density is 2.9 g/cm$^3$). For comparison, the theoretical capacity of graphite is $C^{theor}$=372 mAh/g, while practically achievable at 1,000 mA/g discharge rates do not exceed 200 mAh/g or 300 mAh/cm$^3$ for typical electrode densities of ~1.5 g/cm$^3$. For comparison, FIG. 11E shows the results for a lower content formulation with only ~30 wt %.

All commercial nanopowders of Sn and $SnO_2$ showed negligible rechargeable capacities already after 50 cycles.

In summary, Li-insertion properties of precisely engineered Sn/$SnO_2$ NCs show clear size-dependent character. Under close to practical electrochemical cycling conditions, 10 nm Sn/$SnO_2$ NCs show by a factor of 2 to 3 higher gravimetric and volumetric energy densities as compared to commercial graphite electrodes. Further, the synthesis methodology developed here for Sn and Sn/$SnO_2$ NCs may be of great help for other Sn-based materials, while Sn NCs are of potentially high interest as a low-melting point catalyst for growing 1-dimensional Si and Ge nanostructures.

2. Preparation of SnCu$_x$ Nanocrystals
Chemicals for Synthesis:

Lithium bis(trimethylsilyl)amide (Li[N(SiMe$_3$)$_2$], 97%, Aldrich), Tin (II) chloride (SnCl$_2$, anhydrous, 98%, ABCR), Copper (II) chloride (CuCl$_2$, anhydrous 99,995%, Aldrich), tetrachloroethylene (TCE, ≥99%, Aldrich), diisobutylaluminium hydride ([(CH$_3$)$_2$CHCH$_2$]$_2$AlH, 1.0 M solution in THF, Aldrich), oleylamine (OLA, techn., 40%, TCI) were used as received.

Synthesis of SnCu$_x$ Articles:

In a typical synthesis of 5 nm SnCu$_x$ NPs, oleylamine (OLA, 20 g) was loaded into the three-neck flask and dried under vacuum at 100° C. for 1.5 h under constant stirring. After cooling of oleylamine down to 50° C., the flask was briefly opened to add 0.25 mmol of anhydrous SnCl$_2$ and CuCl$_2$ and again dried under vacuum at 100° C. for 30 min. In parallel, Li[N(SiMe$_3$)$_2$] (3.6 mmol, 0.601 g) was dissolved in 2 ml toluene in glovebox. The temperature of SnCl$_2$, CuCl$_2$/OLA was rinsed to 180° C. under argon, followed by the injection of Li[N(SiMe$_3$)$_2$]/toluene solution, and, in 10 s, 0.6 mL of 1M DIBAH solution in THF. The solution immediately turned dark brown upon injection of DIBAH. Ten sec later, the reaction solution was quickly cooled down to room temperature using water-ice bath. Upon cooling, at about 120-150° C., 10 ml of anhydrous toluene were added. After cooling, SnCu$_x$ NPs were precipitated by adding 60 ml of ethanol following by their centrifugation at 8,000 rpm for 4 min. The SnCu$_x$ NPs were redispersed in tetrachloroethylene (TCE) solution of oleic acid (~6 mL, 1 ml OA/50 ml TCE) to replace the weakly bound OLA molecules. Finally, the SnCu$_x$ NPs were precipitated second time by 15 ml of ethanol, centrifuged and redispersed in common nonpolar solvents such as TCE, chloroform or toluene forming long-term stable solutions.

Suggested optimal reaction conditions for a given size of SnCu$_x$ NPs can be found in Table 2.

TABLE 2

Experimental conditions in the synthesis of SnCu NPs

| # | Mean size, nm | T(inj), ° C. | OLA, g | SnCl$_2$, mmol | CuCl$_2$, mmol | LiNTMS, mmol | DIBAH, mmol | Reaction time |
|---|---|---|---|---|---|---|---|---|
| 1 | 3.5 | 180 | 20 | 0.25 | 0.25 | 3.6 | 0.6 | 10 sec |
| 2 | 6 | 180 | 20 | 0.25 | 0.25 | 3.6 | 0.6 | 1 h |

Results:

As shown in FIG. 12, the size of the SnCu$_x$ NPs can be controlled by the reaction time of the synthesis.

Figure 13:
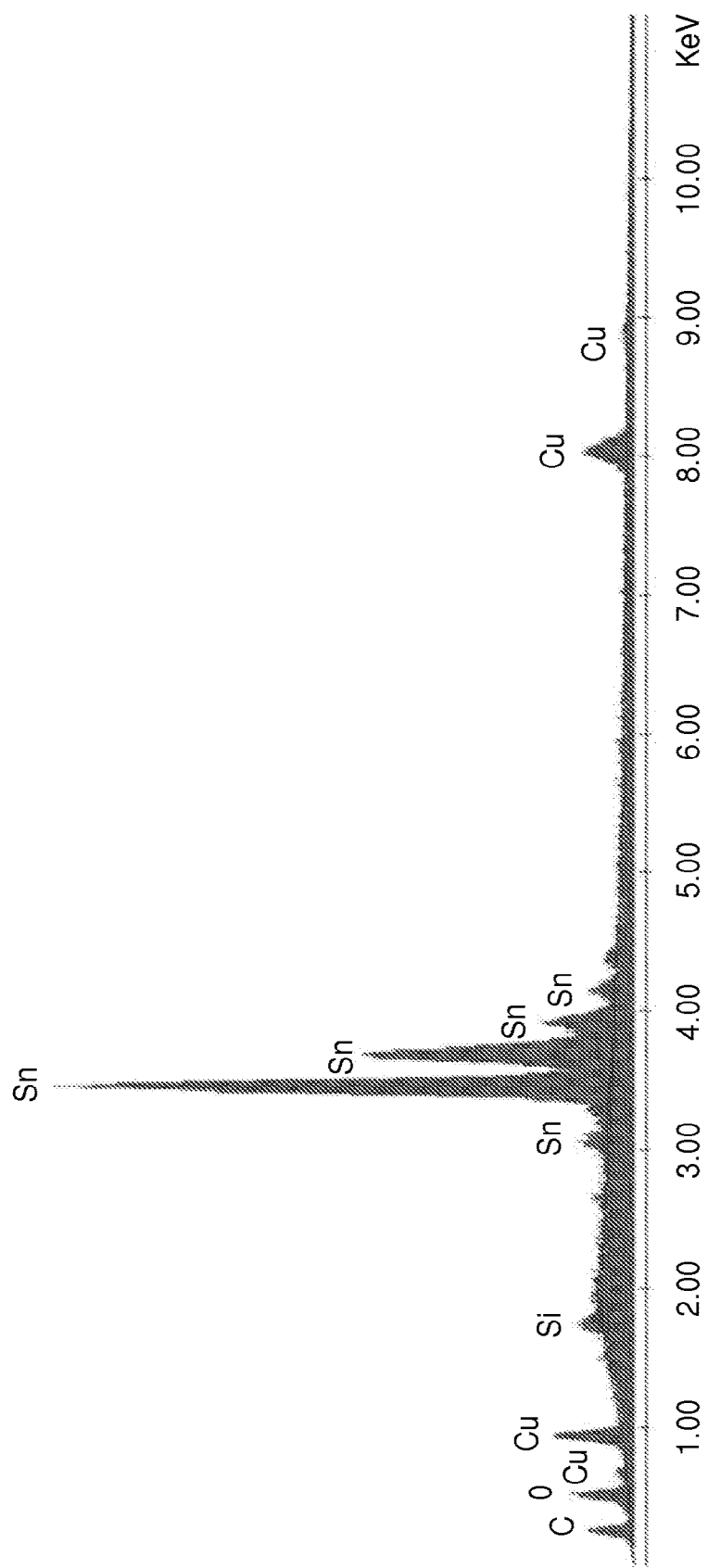
FIG. 13 Energy dispersive x-ray analysis (EDX) results of SnCu NPs synthesized with a reaction time t=10 sec, displayed as intensity (arbitrary units) vs. photon energy (keV).

Energy dispersive x-ray analysis (EDX) results of SnCu$_x$ NPs synthesized with a reaction time t=10 sec are given in FIG. 13. The amounts found are

| Element, At % | |
|---|---|
| SnL, | 42.32 |
| CuK, | 17.12 |

This analysis suggest that the reaction did not proceed stoichiometrically but resulted in a preferred composition with x=0.4, i.e. SnCu$_{0.4}$.

3. Sodium Battery with Tin-Anode
3.1 Materials:

Battery components: Carbon black (Super C65, provided by TIMCAL), dimethyl carbonate (Novolyte), NaPF$_6$ (99%, abcr), ethylene carbonate (Novolyte), 4-fluoro-1,3-dioxolan-2-one (FEC, >98.0%, TCI), glass-fiber separator (EUJ-grade, Hollingsworth & Vose Company Ltd., United Kingdom), carboxymethyl cellulose (CMC, Grade: 2200, Lot No. B1118282, Daicel Fine Chem Ltd).

3.2 Electrochemical Results:

Electrochemical behavior of Sn NPs was tested using CMC binder and carbon black as additives (30 wt % of Sn, 45 wt % of CB and 25 wt % of CMC). Prior to mixing the electrode materials, the ligands on the surface of the Sn NCs were exchanged using KHS in formamide. As electrolyte 1 M NaPF$_6$ in EC:DMC (1:1) was used. For better cyclic stability 3% fluoroethylene carbonate (FEC) was used as an electrolyte additive in all prepared batteries. All batteries were cycled in the 10 mV-2V potential range. The obtained capacities were normalized by the mass of Sn NCs.

Figure 15:
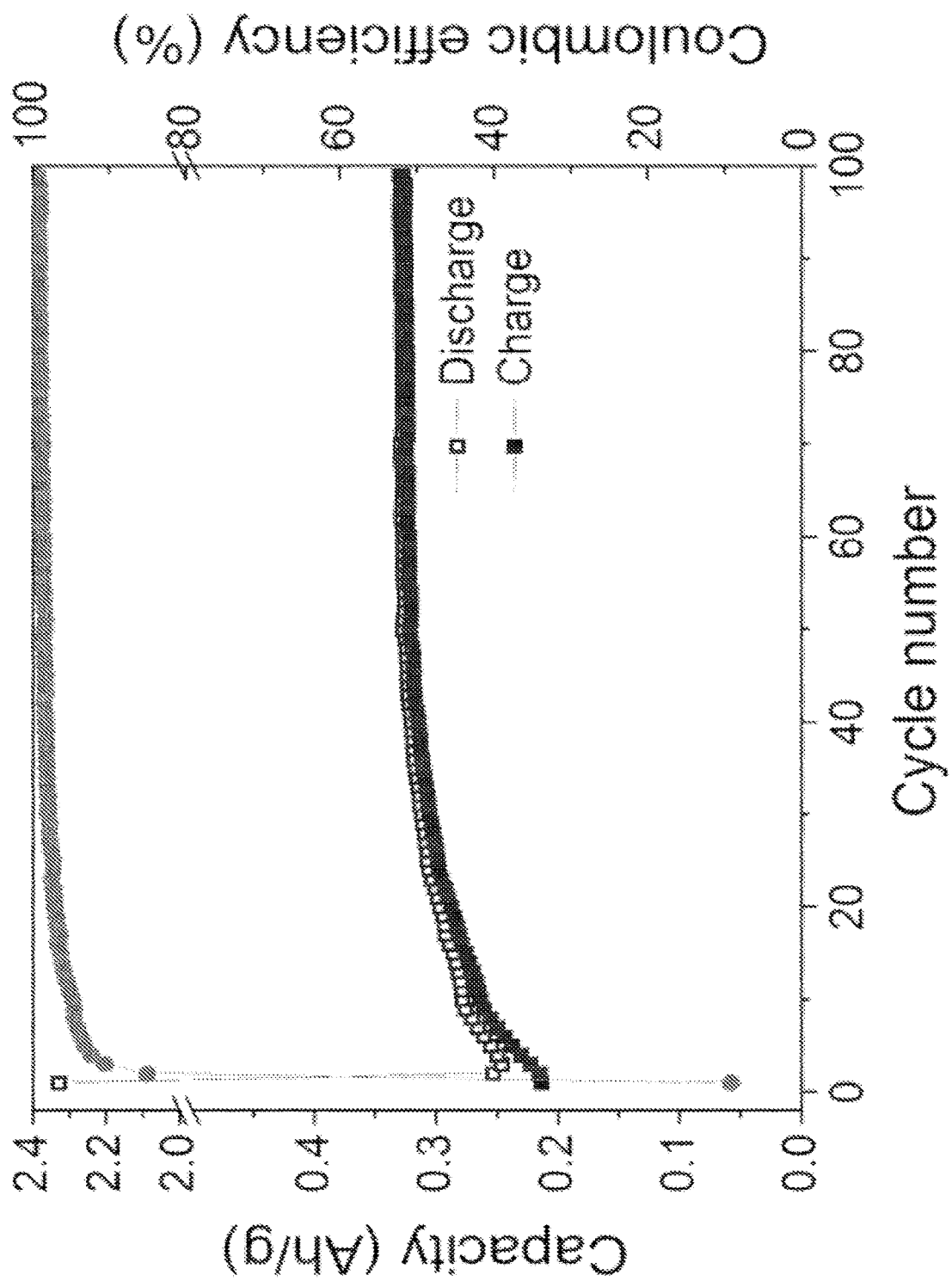
FIG. 15 Reversible charge and discharge capacities for monodisperse Sn NCs (14 nm) cycled galvanostatically at a current density of 0.2 C (169.4 mA/g).

In the fully sodiated state ($Na_{15}Sn_4$) Sn has a theoretical capacity of 847 mAh/g. However, this reaction involves volume changes of more than 300%, which lead to a rapid decrease of the capacity within a few cycles. FIG. 15 shows the electrochemical performance of electrodes composed of 14 nm Sn NCs cycled galvanostatically at 0.2 C (169.4 mA/g). The high capacity of the first discharge cycle can be assigned to the formation of the SEI. After the first 30 cycles a stable capacity of 320-330 mAh/g is obtained with a coulombic efficiency close to 100% demonstrating that Sn NCs are able to accommodate the volume changes associated with the sodiation and desodation effectively.

REFERENCES (1) (a) Derrien, G.; Hassoun, J.; Panero, S.; Scrosati, B. *Advanced Materials* 2007, 19, 2336; (b) Chang, C.-C.; Liu, S.-J.; Wu, J.-J.; Yang, C.-H. *The Journal of Physical Chemistry C* 2007, 111, 16423; (c) Noh, M.; Kwon, Y.; Lee, H.; Cho, J.; Kim, Y.; Kim, M. G. *Chemistry of Materials* 2005, 17, 1926.

(2) (a) Yang, C.-S.; Liu, Q.; Kauzlarich, S. M.; Phillips, B. *Chem. Mater.* 2000, 12, 983; (b) Nayral, C.; Ould-Ely, T.; Maisonnat, A.; Chaudret, B.; Fau, P.; Lescouzères, L.; Peyre-Lavigne, A. *Adv. Mater.* 1999, 11, 61; (c) Nayral, C.; Viala, E.; Fau, P.; Senocq, F.; Jumas, J.-C.; Maisonnat, A.; Chaudret, B. *Chemistry—A European Journal* 2000, 6, 4082; (d) Wang, X.-L.; Feygenson, M.; Aronson, M. C.; Han, W.-Q. *The Journal of Physical Chemistry C* 2010, 114, 14697; (e) Dreyer, A.; Ennen, I.; Koop, T.; Hütten, A.; Jutzi, P. *Small* 2011, 7, 3075; (f) Chou, N. H.; Schaak, R. E. *Chemistry of Materials* 2008, 20, 2081; (g) Hsu, Y.-J.; Lu, S.-Y.; Lin, Y.-F. *Small* 2006, 2, 268; (h) Grandjean, D.; Benfield, R. E.; Nayral, C.; Maisonnat, A.; Chaudret, B. *The Journal of Physical Chemistry B* 2004, 108, 8876; (i) Yu, H.; Gibbons, P. C.; Kelton, K. F.; Buhro, W. E. *Journal of the American Chemical Society* 2001, 123, 9198; (j) Chou, N. H.; Schaak, R. E. *J. Am. Chem. Soc.* 2007, 129, 7339.

(3) Mondini, S.; Ferretti, A. M.; Puglisi, A.; Ponti, A. *Nanoscale* 2012, 4, 5356.

(4) Wotcyrz, M.; Kubiak, R.; Maciejewski, S. *physica status solidi (b)* 1981, 107, 245.

(5) Cossement, C.; Darville, J.; Gilles, J. M.; Nagy, J. B.; Fernandez, C.; Amoureux, J. P. *Magnetic Resonance in Chemistry* 1992, 30, 263.

(6) Indris, S.; Scheuermann, M.; Becker, S. M.; Šepelák, V.; Kruk, R.; Suffner, J.; Gyger, F.; Feldmann, C.; Ulrich, A. S.; Hahn, H. *J. Phys. Chem. C.* 2011, 115, 6433.

(7) (a) Takahashi, H.; Meshitsuka, S.; Higasi, K. *Spectrochimica Acta Part A: Molecular Spectroscopy* 1975, 31, 1617; (b) Adler, H. H.; Kerr, P. F. *American Mineralogist* 1965, 50, 132.

(8) Beattie, S. D.; Larcher, D.; Morcrette, M.; Simon, B.; Tarascon, J. M. *Journal of The Electrochemical Society* 2008, 155, A158.

The invention claimed is:

1. A tin based anode material for a rechargeable battery, the anode material comprising nanocrystals of composition $SnO_y$, wherein $0 \leq y \leq 2$, the nanocrystals forming a substantially monodisperse ensemble with an average size not exceeding 20 nm and a size deviation not exceeding 15%, the nanocrystals consisting of a single-crystalline Sn core entirely surrounded by a shell of $SnO_2$ directly contacting a surface of the single-crystalline Sn core, the shell of $SnO_2$ having a thickness of not less than 10 nm.

2. The material according to claim 1, wherein the average size of the nanocrystals does not exceed 15 nm.

3. The material according to claim 2, wherein the average size of the nanocrystals does not exceed 10 nm.

4. The material according to claim 1, wherein the nanocrystals are coated with a capping species, the capping species being a sulfur containing species selected from the group consisting of $SH^-$, $SO_4^{2-}$ or $S^{2-}$.

5. The material according to claim 1, wherein the shell of $SnO_2$ is an amorphous oxide shell.

6. The material according to claim 1, wherein the nanocrystals are all spherical or centrosymtnetric polyhedral in shape.

7. The material according to claim 1, wherein the size deviation not exceeding 15% is defined by a formula for size deviation S:

$$S = FWHM/2d \times 100 [\%],$$

where FWHM is a full width at half maximum of a Gaussian fit of measured nanocrystals, and d is a diameter of the measured nanocrystals at a maximum of the Gaussian fit.

8. The material according to claim 1, wherein the shell includes only the atoms Sn and O.

9. A method for preparing a tin based anode material for a rechargeable battery, the anode material comprising nanocrystals of composition $SnO_y$, wherein $0 \leq y \leq 2$, the nanocrystals forming a substantially monodisperse ensemble with an average size not exceeding 20 nm and a size deviation not exceeding 15%, the nanocrystals consisting of a single-crystalline Sn core entirely surrounded by a shell of $SnO_2$ directly contacting a surface of the single-crystalline Sn core, the shell of $SnO_2$ having a thickness of not less than 10 nm, said method comprising:

a) in a non-aqueous solvent, reacting a tin salt and an organometallic amide reactant and oleylamine, b) adding thereto a transform reactant selected from the group consisting of reducing agents, oxidizing agents and alloying agents, c) adding thereto a precipitating agent, thereby forming a substantially monodisperse nanocrystalline material comprising the nanocrystals of composition $SnO_y$, coated with an initial capping layer, and d) optionally carrying out a ligand exchange to provide an inorganically capped nanocrystalline material or an uncapped nanoctystalline material.

10. The method according to claim 9, wherein said solvent is oleylamine.

11. The method according to claim 9, wherein said tin salt is selected from the group consisting of tin chloride, tin acetate, tin triflate and tin silylamide.

12. The method according to claim 9, wherein said organometallic amide reactant is selected from the group consisting of $LiN(Si(CH_3)_3)_2$, $LiN(CH_3)_2$, and lithium oleylamide.

13. The method according to claim 9, wherein said reducing agents are selected from the group consisting of diisobutylaluminum hydride and lithium triethylborohydride.

14. The method according to claim 9, wherein said oxidizing agents are selected from the group consisting of oxygen, an oxygen/nitrogen mixture and ozone.

15. The method according to claim 9, wherein said alloying agents are selected from the group consisting of a chloride, bromide, acetate and triflate.

16. The method according to claim 9, wherein said precipitating agent is selected from the group consisting of ethanol, methanol, acetone and acetonitrile.

17. A rechargeable battery comprising an anode and a cathode, wherein the anode comprises a tin based anode material comprising nanocrvstals of composition $SnO_y$, wherein $0 \leq y \leq 2$, the nanoctystals forming a substantially monodisperse ensemble with an average size not exceeding 20 nm and a size deviation not exceeding 15%, the nanocrystals consisting of a single-crystalline Sn core entirely surrounded by a shell of $SnO_2$ directly contacting a surface of the single-crystalline Sn core, the shell of $SnO_2$, having a thickness of not less than 10 nm.

18. The rechargeable battery according to claim 17, wherein said rechargeable battery is a sodium ion battery.

19. The rechargeable battery according to claim 17, wherein said rechargeable battery is a lithium ion battery.

\* \* \* \* \*